US011443268B2

(12) United States Patent
Fosgard

(10) Patent No.: US 11,443,268 B2
(45) Date of Patent: Sep. 13, 2022

(54) SYSTEM AND METHOD FOR INTERMODAL MATERIALS DELIVERY

(71) Applicant: Eric Fosgard, Portland, OR (US)

(72) Inventor: Eric Fosgard, Portland, OR (US)

(73) Assignee: TULIPS CORPORATION, Milwaukie, OR (US)

(*) Notice: Subject to any disclaimer, the term of this patent is extended or adjusted under 35 U.S.C. 154(b) by 112 days.

(21) Appl. No.: 15/824,991

(22) Filed: Nov. 28, 2017

(65) Prior Publication Data
US 2019/0164113 A1     May 30, 2019

(51) Int. Cl.
*G06Q 10/08*     (2012.01)
*G05D 1/02*     (2020.01)
(Continued)

(52) U.S. Cl.
CPC ....... *G06Q 10/083* (2013.01); *G01C 21/3415* (2013.01); *G01C 21/3492* (2013.01);
(Continued)

(58) Field of Classification Search
CPC .... G05D 1/0088; G05D 1/0027; G05D 1/021; G05D 1/0225; G06Q 10/083;
(Continued)

(56) References Cited

U.S. PATENT DOCUMENTS 5,908,283 A     6/1999     Huang et al.
6,421,606 B1 *     7/2002     Asai .................. G01C 21/3688
                                                           701/410
(Continued)

FOREIGN PATENT DOCUMENTS

CN     106845702 A     6/2017
JP     2019006517 A     1/2019
WO     2017045717 A1     3/2017

OTHER PUBLICATIONS

Trentini, Anna et al., "Toward a Shared Urban Transport System Ensuring Passengers & Goods Cohabitation", TeMA: Journal of Landuse, Mobility and Environment, published Jul. 21, 2010, 8 pages, vol. 3, No. 2, © Copyright dell'autore, Department of Territorial Planning and Science, University of Naples Federico II, Naples, Italy.

(Continued)

*Primary Examiner* — Scott A Zare
(74) *Attorney, Agent, or Firm* — Howard Russell, Attorney at Law

(57) ABSTRACT

Systems and methods for the intermodal delivery of materials within an at least substantially autonomous carrier traveling along a delivery path. The carrier may dock with a transit vehicle or engage directly with a railway to travel along a transit line while making a delivery. The carrier may also be suitable for securably storing materials therein, such as where a plurality of carriers stop at a storage hub located substantially near and/or along the delivery path. The storage hub may include a charging station for the carriers, and serve as a portable warehouse for both materials and carriers. When adequately charged, the carrier may deliver materials to their final destinations. Or, the materials may be transferred to a load transporter to facilitate first- and/or last-mile delivery.

23 Claims, 9 Drawing Sheets

(51) Int. Cl.
- *G05D 1/00* (2006.01)
- *G01C 21/34* (2006.01)
- *G06Q 50/28* (2012.01)
- *G01S 17/02* (2020.01)
- *G01S 13/02* (2006.01)
- *G01S 13/88* (2006.01)
- *G01S 13/931* (2020.01)
- *G01S 17/931* (2020.01)

(52) U.S. Cl.
CPC .............. *G01S 13/02* (2013.01); *G01S 17/02* (2013.01); *G05D 1/0088* (2013.01); *G05D 1/0225* (2013.01); *G06Q 50/28* (2013.01); *G01S 13/886* (2013.01); *G01S 13/931* (2013.01); *G01S 17/931* (2020.01)

(58) Field of Classification Search
CPC ................ G06Q 50/28; G01C 21/3415; G01C 21/3492; G01S 13/02; G01S 17/02
See application file for complete search history.

(56) References Cited

U.S. PATENT DOCUMENTS

| | | | |
|---|---|---|---|
| 9,004,840 B2 | 4/2015 | Kinugawa et al. | |
| 9,595,018 B2 | 3/2017 | Carvajal | |
| 9,833,097 B2 * | 12/2017 | Byers | A47G 29/14 |
| 9,915,956 B2 * | 3/2018 | Bokeno | B64C 39/024 |
| 10,192,189 B2 | 1/2019 | Bhatt | |
| 10,216,188 B2 * | 2/2019 | Brady | G05D 1/0276 |
| 10,222,798 B1 * | 3/2019 | Brady | G05D 1/0278 |
| 10,241,516 B1 * | 3/2019 | Brady | G05D 1/0225 |
| 10,245,993 B1 * | 4/2019 | Brady | B60P 1/6418 |
| 10,248,120 B1 * | 4/2019 | Siegel | G01C 21/3602 |
| 10,255,577 B1 | 4/2019 | Steves et al. | |
| 10,303,171 B1 * | 5/2019 | Brady | G05D 1/0088 |
| 10,308,430 B1 * | 6/2019 | Brady | B65G 1/1373 |
| 10,310,499 B1 * | 6/2019 | Brady | G05D 1/0027 |
| 10,310,500 B1 * | 6/2019 | Brady | G05D 1/0027 |
| 10,310,517 B2 * | 6/2019 | Paduano | G05D 1/042 |
| 10,340,167 B2 | 7/2019 | Yoo et al. | |
| 10,437,252 B1 * | 10/2019 | Liu | G01C 21/36 |
| 10,657,486 B1 | 5/2020 | Wolter et al. | |
| 11,222,299 B1 * | 1/2022 | Baalke | G06Q 10/087 |
| 2011/0107939 A1 * | 5/2011 | Amiri | B62D 55/06 |
| | | | 104/306 |
| 2015/0227882 A1 * | 8/2015 | Bhatt | G06Q 10/08355 |
| | | | 705/330 |
| 2016/0031344 A1 * | 2/2016 | Carson | B60N 2/3043 |
| | | | 297/335 |
| 2016/0132059 A1 * | 5/2016 | Mason | B65G 1/1373 |
| | | | 701/28 |
| 2017/0011340 A1 * | 1/2017 | Gabbai | G06Q 10/0836 |
| 2017/0341795 A1 * | 11/2017 | Colson | B33Y 10/00 |
| 2018/0232839 A1 | 8/2018 | Heinla | G05B 19/41895 |
| 2019/0039731 A1 * | 2/2019 | Marcath | B64F 1/007 |
| 2019/0056752 A1 * | 2/2019 | Winkle | G05D 1/0295 |
| 2019/0102735 A1 * | 4/2019 | Barton | G06Q 10/0833 |
| 2019/0108472 A1 * | 4/2019 | Sweeney | G06Q 10/083 |
| 2019/0114564 A1 * | 4/2019 | Ferguson | G06Q 10/08355 |
| 2019/0130349 A1 * | 5/2019 | Ferguson | G06Q 10/08355 |
| 2019/0259000 A1 * | 8/2019 | Buckhalt | G07C 9/00817 |
| 2019/0271988 A1 * | 9/2019 | High | G01C 21/3438 |
| 2019/0347942 A1 * | 11/2019 | Kimchi | B64D 1/12 |
| 2020/0342392 A1 | 10/2020 | Godwin et al. | |

OTHER PUBLICATIONS

Postbus, image 1, published before Nov. 28, 2017, 1 page.
Postbus, image 2, published before Nov. 28, 2017, 1 page.
Residential and Civil Construction Alliance of Ontario, Ontario Must Prepare for Vehicle Automation Date: Oct. 2016 Publisher: RCCAO Published in: Ontario, CAN.

* cited by examiner

SYSTEM AND METHOD FOR INTERMODAL MATERIALS DELIVERY

FIELD

This patent application generally relates to materials delivery, and more specifically to smart systems and methods for the intermodal delivery of materials using substantially autonomous carriers and transit vehicles.

BACKGROUND

For various reasons, it may be desirable to deliver materials across and between various locations. Conventional systems and methods for materials delivery have included the use of delivery trucks, cargo bikes, drones, and robotic cars. However, such systems and methods have not been designed to optimize the underutilized capacity of existing transit and parking infrastructures, to thereby make delivery more cost-effective, economical, and ecofriendly. For example, U.S. Pat. No. 7,991,505B2, to Lert, Jr. et al., for Materials-Handling System Using Autonomous Transfer and Transport Vehicles, issued Aug. 2, 2011, teaches "[m]ethods and apparatus for selecting and combining packages in an outbound container by employing autonomous transfer and transport vehicles which move on a network of roadways . . . ." U.S. Patent Publication No. 2015/0006005A1, to Yu et al., for Autonomous Unmanned Road Vehicle for Making Deliveries, published Jan. 1, 2015, discloses "[a]n autonomous unmanned road vehicle and how it can be used to make deliveries." U.S. Patent Publication No. 2015/0227882A1, to Kushal Mukesh Bhatt, for Mobile Pickup Locations, published Aug. 13, 2015 teaches "[a] mobile pickup location . . . that may be associated with a vehicle such as a public bus." And, U.S. Pat. No. 9,256,852B1, to Jussi Myllymaki, for Autonomous Delivery Platform, issued Feb. 9, 2016, teaches "[a]n autonomous road vehicle is operative to receive destination information, and to drive to a destination based on the destination information."

However, the foregoing disclosures have presented systems and methods that have been expensive and complicated, have required significant intermediate user intervention, and have not sufficiently taken advantage of existing transit and parking infrastructures, as well as prepaid transit movement—especially during off-peak hours—to more efficiently and autonomously facilitate materials delivery to and between end users. Thus, it would be desirable to reduce operation and maintenance costs, as well as bypass construction costs, that have been associated with the at least partially autonomous delivery of materials, by optimizing the underutilized capacity of transit and parking infrastructures.

SUMMARY

The present teachings disclose a smart delivery system that may include at least one substantially autonomous carrier configured to deliver at least one material along a delivery path, from at least a first location, such as an origin zone, to a second location, such as a destination zone. The delivery path may include a plurality of intermediate transfer locations, including a third location, a fourth location, and so on. The carrier may utilize a mode of transit, such as a commuter train, a cargo train, a commuter bus, or a semi-trailer mode of transit, to facilitate its movement during a transit leg of the delivery path. The carrier may also navigate safely along the delivery path based on environmental data obtained via a plurality of sensors. Additionally, the delivery system may include a computer server configured to communicate delivery data with a carrier transceiver, the delivery data including a parcel quantity, a means of parcel identification, and/or a parcel destination. The server may also be configured to communicate transit data with the carrier transceiver, the transit data including a transit vehicle location and/or a transit link location. The delivery system may further include a computing device with a memory and a processor configured to communicatively connect with the server, process the delivery data and transit data to compute the delivery path based on that data, and re-compute the delivery path in real time based on the environmental data.

In some embodiments, the delivery system may additionally include at least one transit link where the carrier, or carriers, may removably dock with a transit vehicle that is stopped at the transit link. Such a transit link may, for example, include stops, stations, and/or connections for light rail, bus, trolley, street car, paratransit, and ferry transit. In some embodiments, the delivery system may further include at least one load transporter suitable for receiving material from the carrier, or carriers, to thereby transport the material during a transporter leg of the delivery path. Some embodiments may include more than one transporter leg, such as where a load transporter facilitates delivery for both the first and last mile of delivery—or even an intermediate portion of the delivery path. Such a load transporter may, for example, include cargo bikes, cargo trikes, delivery trucks, and private vehicles. In some embodiments, the delivery system may include a storage hub located substantially near and/or along the delivery path and suitable for storing a plurality of carriers. In some embodiments, the storage hub may include a charging station suitable for charging the carriers. In some embodiments, the storage hub and/or the plurality of carriers may be controllable by a centralized server that is suitable for, and capable of, configuring and/or otherwise organizing the plurality of carriers to optimize space and/or maximize security.

The present teachings also disclose a delivery method, comprising the steps of selecting an at least substantially autonomous carrier, or carriers, suitable for delivering at least one material from an origin zone to a destination zone, determining a suitable delivery path for the carrier, or carriers, to deliver the at least one material from the origin zone to the destination zone, and selecting a transit vehicle suitable for facilitating movement of the at least one carrier along a transit leg of the delivery path. In some embodiments, the transit vehicle may be selected based on a plurality of vehicle values, including at least an economic value, an environmental value, and a public welfare value. In some embodiments, the delivery method may also include the step of providing delivery data to a server having a processor, the delivery data including a material size, a material weight, a pickup point, and/or a pickup time. In some embodiments, the delivery method may further comprise a step of providing transit data to the server, the transit data including a transit schedule, a transit vehicle location, a transit link location, a transit route, and/or a transit ridership level. In some embodiments, the delivery path may be determined based on at least one of the vehicle values, the delivery data, and/or the transit data. In some embodiments, the delivery method may include a step of dispatching the carrier during a time of day when the transit ridership level is low. In some embodiments, the delivery method may include a step of enabling the carrier to board the transit vehicle, either to deposit material, or alternatively for the duration of a transit leg of the delivery path. In some embodiments, the delivery method may include a step of transferring the at least one material from the carrier to a load transporter for a transporter leg of the delivery path.

The present teachings further disclose substantially autonomous parcel carrier, comprising a carrier body configured to contain a parcel to be delivered from an origin zone to a destination zone and along a substantially predetermined delivery path, and to removably dock with a transit vehicle to thereby enable the carrier to travel along a transit line for a transit leg of the delivery path. Additionally, the carrier may comprise a carrier transceiver configured to communicatively connect with at least a server, receive delivery data from the server, including a parcel quantity and/or a means of parcel identification. The carrier transceiver is also configured to receive transit data from the server, including a transit vehicle location, a transit link location, and/or a transit schedule; and further configured to transmit carrier data to the server as the carrier travels along the delivery path, including, without limitation, at least a carrier location. The carrier may also include a navigation control operatively connected to the carrier transceiver, including a memory and a processor configured to receive environmental data via a plurality of sensors. The processor may also be configured to compute the delivery path based on the delivery data, the transit data, and/or the environmental data; and to re-compute the delivery path in real time based on the environmental data. The processor may further be configured to determine at least one safety parameter based on the environmental data, including, without limitation, at least a safe travel speed.

In some embodiments, the carrier body may include at least one compartment configured to enable removal of the parcel upon providing suitable parcel access data to the carrier. In some embodiments, the plurality of sensors may include a LIDAR sensor, a RADAR sensor, and/or a camera sensor suitable for detecting potential impacts, theft, and/or vandalism. In some embodiments, the carrier may include a plurality of lights configured to indicate a direction of travel, a change in the direction of travel, and/or a deceleration of the carrier. In some embodiments, at least one wheel of the carrier may be configured to removably engage with a railway, thereby enabling the carrier to travel along the railway during a transit leg of the delivery path. In some embodiments, the carrier body may have a width, a height, and a length suitable to clear an opening of the transit vehicle so that the carrier is securably positionable inside the transit vehicle.

Thus, the various aspects of the invention disclosed teach a novel approach to delivery designed to increase the efficiency of and reduce the costs associated with delivering and storing materials along a delivery path, using an at least substantially autonomous carrier. Further, as contemplated by an aspect of the invention disclosed herein, the delivery path may take an unexpected direction by merging with a transit line, such as a light rail line, for at least a portion of the delivery path. For example, a fleet of carriers may be dispatched along the delivery path during periods off-peak transit ridership, at later times in the evenings, and during weekends to optimize the underutilized space on a light rail transit vehicle. The same fleet of carriers may also alight from the transit vehicle at any transit link, recharge at any suitable parking facility located along or near the delivery path, and/or store materials at the parking facility—thereby creating a portable warehouse there. In conjunction with the carriers, other types of small load transporters, such as a cargo bike, may facilitate delivery of materials to their final destinations, by receiving the materials from the carriers and completing the first- and/or last-mile delivery. Such systems and methods may combine the benefits of transit (e.g., existing infrastructures and prepaid operation costs) with the benefits of ultra-small electric vehicles (e.g., low emissions and no driver costs) to achieve an efficient, economical, and ecofriendly solution to delivering materials.

Features, functions, and advantages of the present disclosure may be achieved independently in various embodiments, or may be combined in yet other embodiments. Further details of the disclosure may be seen in reference to the following Detailed Description and accompanying drawings.

DETAILED DESCRIPTION

Overview

The present disclosure contemplates an intermodal system and method that may increase the efficiency of both delivery and transit. As disclosed herein, the system and method may offer a sustainable and economical solution to many problems that may be faced in last-mile delivery. By using transit systems that are in place in many, if not most, urban areas, the disclosed systems and methods may be implemented at relatively low costs, and may not require major changes to a city's existing infrastructure and operations. And, by using ultra-small electric vehicles integrated with transit, the disclosed systems and methods may improve the value of transit by offering significant opportunities for public-private partnerships between local governments, transit agencies, technology companies, courier companies, and other private companies in the business of delivery and transportation. In addition to potential economic benefits, the disclosed systems and methods may also offer a meaningful solution to the problem of certain communities that may experience low accessibility to important resources.

Various aspects of the present disclosure are described in Sections 1-5 below and illustrated in the associated drawings, using certain embodiments and examples intended to illustrate but not limit the disclosure. Nothing in the teachings is intended to imply that any particular feature or characteristic of these embodiments and examples is essential to the disclosure. The scope of protection is defined and limited only by the claims that follow this description, and not by any particular embodiment described herein. Additionally, certain aspects of the teachings may be described as a "first", a "second," a "third," and so forth. However, this numbering scheme is not intended to limit the disclosure to only the numbers described herein, nor to imply that any particular sequence of elements and/or steps is necessary to the disclosure.

1. General Features

This section describes general features of systems and methods for materials delivery, according to aspects of the present teachings. See FIG. 1.

Figure 1:
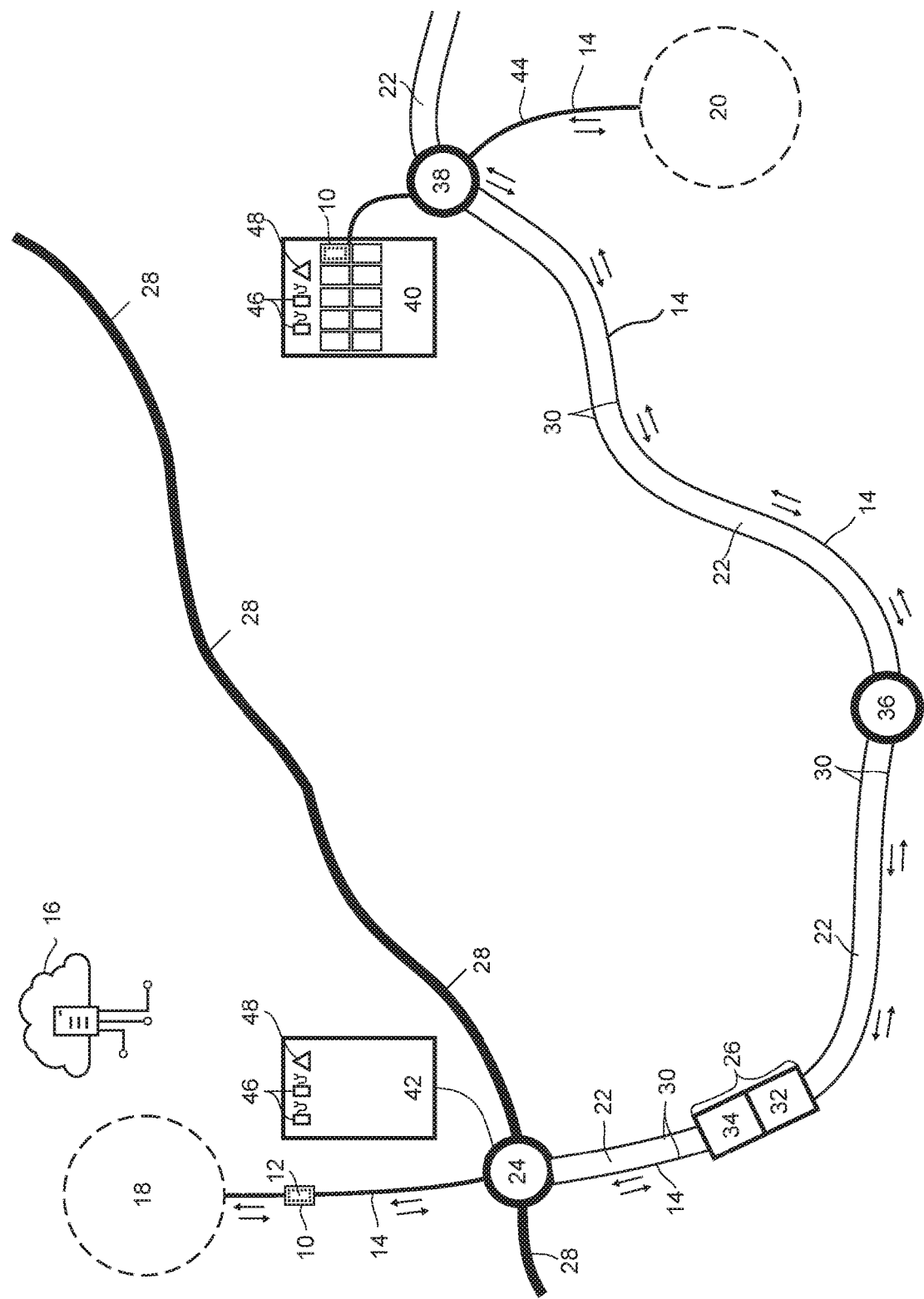
FIG. 1 shows an aerial view of an exemplary delivery path along which a substantially autonomous carrier may travel, according to aspects of the present teachings.

As shown in FIG. 1, a preferred embodiment of the disclosed delivery system may involve using at least one substantially autonomous carrier 10 to deliver at least one material 12 along a delivery path 14. Although only one delivery path is shown in FIG. 1, the carrier(s) 10 may follow any number of suitable delivery path(s), depending on the origin and trajectory of the material(s) 12. Additionally, in some embodiments, the carrier(s) 10 may travel bi-directionally along any number of delivery paths, as indicated by the arrow symbols pointing in opposite directions along the delivery path 14 in FIG. 1. In some embodiments, the carrier(s) 10 may communicate with a computer server 16, such as by receiving delivery data—including but not limited to a suitable delivery path—from the server 16. The carrier(s) 10 may also be in communication with a GPS satellite, which may help track the location and/or movement of the carrier(s) 10 near, along, and/or beyond the delivery path 14. Also in some embodiments, the movement of the carrier(s) 10 may be within geo-fenced areas encompassing the delivery path 14. Additionally or alternatively, the areas surrounding the delivery path 14 may also be geo-fenced.

In some embodiments, the server 16 may also be in communication with a cellular radio tower, which may enable a user to send and/or receive data pertaining to deliveries, such as by using a smart device application to arrange for delivery and/or pickup of the material(s) 12. The material(s) 12 may comprise one or more package(s), parcel(s), good(s), product(s), item(s), container(s), and/or another suitable article(s) to be delivered. For example, customers may order the material(s) 12 directly from a store, either as a one-time purchase or on a monthly subscription. Additionally or alternatively, the material(s) 12 may be a parcel that has arrived at the post office but has yet to embark on the last mile of delivery. In some embodiments, the carrier(s) 10 may deliver the material(s) directly to customers at their residential addresses. In alternative embodiments, the carrier(s) 10 may deliver the material(s) 12 to shops, office buildings, restaurants, or any other suitable commercial locations. In yet other embodiments, customers pay pick up the material(s) 12 directly from the carrier(s) 10, at any suitable pickup point along the delivery path 14.

In some embodiments, the material(s) 12 may begin their journey at an origin zone 18 and complete their journey when delivered to a destination zone 20. The origin zone 18 may include an airport, mall, post office, warehouse, store, supplier, distribution center, and/or any other facility suitable for sending out deliveries. For example, the origin zone 18 may include a local book store, and the material(s) 12 may include several parcels of books to be delivered directly to customers at their homes and/or offices. Alternatively or additionally, the origin zone 18 may include a post office, which may receive the material(s) 12 from around the globe. The post office may then dispatch the material(s) 12 within the carrier(s) 10 for delivery, as an alternative to, or in conjunction with, using load transporters such as but not limited to delivery trucks or cargo bikes to complete those deliveries.

In a preferred embodiment, the delivery path 14 may incorporate a transit line 22. As shown in FIG. 1, the origin zone 18 may be conveniently located near or on the transit line 22 so that the carrier(s) 10 may not need to travel a long distance from the origin zone 18 to a first transit link 24 located on the transit line 22. Likewise, the destination zone 20 may also be conveniently located near or on the transit line 22 so that the carrier may not need to travel a long distance from the transit line 22 to reach the destination zone 20. However, some embodiments may include destination zones having locations such that it may not be practical for the carrier(s) 10 to complete delivery. In such embodiments, it may be useful to transfer the material(s) 12 from the carrier(s) 10 and into another load transporter to complete delivery. Examples of load transporters may include, without limitation, cargo bikes, bicycle couriers, privately-owned cars, and/or any other suitable vehicle suitable for completing delivery of the material(s) 12.

In some embodiments, the origin zone 18 and the destination zone 20 may be interchangeable. Correspondingly, the carrier(s) 10 may travel bi-directionally along the delivery path 14, such that the carrier(s) 10 may travel away from the destination zone 20 and back toward to the origin zone 18 for any suitable purposes. For example, the carrier(s) 10 may return to "home base" at the origin zone 18 after completing a delivery. Or, certain customers may want to return the material(s) 12 to the origin zone 18 for a refund or exchange. Other customers may want to dispatch their own material(s) 12 along the delivery path 14, such that the presently disclosed systems and methods may be used for both sending and receiving materials. Thus, in some embodiments, the material(s) 12 may be picked up and/or dropped off at the origin zone 18 and/or the destination zone 20, depending on the direction of travel required for the material(s) 12 to be delivered.

Additionally, in some embodiments, large and/or small load transporters may be used near the origin zone 18 and/or the destination zone 20 to facilitate delivery of the material(s) 12. In some embodiments, it may be desirable to limit the movement of the carrier(s) 10 to areas near transit links—and to use load transporters to travel distances further away from transit links. In fact, delivery may be more efficient under such approaches where the carrier(s) 10 move at ultra-slow speeds within geo-fenced areas, leaving the longer-distance movement of materials to load transporters. For example, a load transporter located near the origin zone 18 may unload the material(s) 12 onto the carrier(s) 10, so that the carrier(s) 10 may travel toward the first transit link 24 to then unload the material(s) 12 onto a transit vehicle 26 therefrom. The transit vehicle 26 may then travel along the transit line 22 toward the destination zone 20. This journey is discussed in further detail below.

With respect to transit links, the transit link 24 may be any suitable location where a passenger and/or materials may board or alight from a transit vehicle. For example, the transit link 24 may be a stop, station, or connection for a bus, train, tram, light rail, ferry, subway, trolley car, paratransit, high speed rail, or any other suitable mode of transit. However, the transit link 24 may not necessarily be where commuters board and/or alight from transit vehicles. In some embodiments, the transit link 24 may also connect lines of different modes of transit, such as a first transit line 22 and a second transit line 28. In other words, the transit link 24 may be suitable for transit rider(s) and/or the carrier(s) 10 to not only board and/or alight from one transit vehicle, but also to make transfers or connections with additional transit vehicles. For example, the first transit line 22 may include a railway 30 and may be suitable for the transit vehicle 26, whereas a second transit line 28 may be a bus route suitable for city buses and/or paratransit services. In some embodiments, using a railway system may provide the greatest benefits in terms of cost savings and efficiency. Other embodiments may include any other suitable types of transit, including but not limited to train, tram, light rail, ferry, subway, trolley car, and/or high speed rail.

As shown in FIG. 1, the carrier(s) 10 may be loaded with the material(s) 12 and then be dispatched along the delivery path 14 toward the transit link 24. At the transit link 24, the carrier(s) 10 may navigate safely and autonomously within areas that may be shared with pedestrians, transit riders, and cyclists. Also at the transit link 24, the carrier(s) 10 may dock with the transit vehicle 26, either autonomously or with human assistance, to deposit material(s) 12 onto the transit vehicle 26. This may be considered to be a "transit leg" of delivery path 14. In other embodiments, the carrier(s) 10 may physically board the transit vehicle 26, be removably attached to the transit vehicle 26 (like a trailer, as an example), and/or engage directly with the railway 30 of the transit line 22 to take advantage of the low-friction and cost benefits of rail transport. Examples of such benefits may include significantly reduced "wear and tear" on the carrier(s) 10, less miles traveled by the carrier(s) 10, and less charging time necessary, due to piggybacking on transit vehicles. These benefits may in turn reduce maintenance costs, reduce downtime, and prolong the life expectancy of the carrier(s) 10. Other benefits may include reducing or eliminating any labor costs associated with delivery, particularly where the carrier(s) 10 may be fully autonomous and where customers may access their parcels directly therefrom.

Additionally, in some embodiments, the carrier(s) 10 may be dispatched on delivery runs during periods of low or "off-peak" transit ridership to optimize any underutilized space on the transit vehicle 26. For example, light rail ridership levels may be predictably lower during later times in the evenings and often on weekends, as compared with the times of day during which riders may typically be commuting to and from work, or while running errands. Embodiments that make use of this otherwise underutilized space may not only save costs, but also increase delivery volumes. However, alternative embodiments may include the use of transit vehicles beyond normal operating hours, such as by extending operating hours to specific carrier-only times during the middle of the night.

For example, the transit vehicle 26 may consist of a first railcar 32 and a second railcar 34. In some embodiments, the first railcar 32 may be used to transport one or more carriers and any material(s) 12 therein, while the second railcar 34 may be used to transport commuters. On a regular transit schedule, a single transit vehicle 26 may have the capacity to facilitate dozens of deliveries per hour or even hundreds of deliveries over several hours. In embodiments using both the railcars 32 and 34 for delivery, this capacity may be doubled. And, in embodiments using more than just one transit line 22, delivery volumes may be substantially multiplied at a fraction of the costs that may be incurred by traditional shipping methods. As such, the present disclosure contemplates a substantially or fully-automated system of delivery within or across principally urban environments, which may be implemented using existing infrastructures—without disrupting a city's everyday flow of transit, and without contributing to traffic congestion on roadways.

In some embodiments, the carrier(s) 10 may deliver the material(s) 12 along the entirety of the delivery path 14 to reach the destination zone 20. In alternative embodiments, however, customers could pick up their pre-ordered material(s) 12 directly from the carrier(s) 10 at any suitable pickup point along the transit line 22. For example, a customer may plan her commute home from the work by boarding the transit vehicle 26 at a second transit link 36, and may retrieve the material 12 directly from the carrier 10 during her commute. In such embodiments, customers may track the movement of the material(s) 12 along the delivery path 14 by using a smart phone application or any other suitable software. In other embodiments, the carrier 10 may alight from the transit vehicle 26 at a pickup point located at any transit link, so that a customer may retrieve the material 12 directly from the carrier 10 without necessarily having to board the transit vehicle 26. Conversely, a customer may drop off a material to be delivered by the carrier 10. In such embodiments, a customer may pre-arrange for material pick up or drop off, and input a unique carrier access code that allows the customer to insert and/or remove the material 12 from the carrier 10.

Enabling pickup and drop off at one or more transit links along delivery path 14 may effectively transform any such transit link into a mini commerce hub, such as a food cart area, a farmer's market, a mail center, an event space, a pop-up shop, or any combination thereof. The potential for such commerce hubs creates a multi-purpose role for transit agencies, and may potentially increase transit ridership. Additionally, these commerce hubs may create value for the public by providing communities with access to important resources such as nutritious and affordable foods. For example, certain communities may have zero or limited access to fresh fruit, vegetables, and other healthful whole foods due to a lack of grocery stores, farmer's markets, and other healthy food providers within one or more miles. As a result, members of such low-access communities may be forced to purchase sugary, heavily processed, and fat-laden foods from nearby convenience stores. However, the present disclosure may provide an affordable way for healthful foods to reach low-access communities near transit lines.

In some embodiments, the above-described transit leg of the delivery path 14 may be all that is required to complete delivery of the material(s) 12. However, the present teachings also provide a system and method for storing the material(s) 12 within the carrier(s) 10, which may be particularly useful for embodiments having extended delivery paths. Of course, the "modular" storage of materials within the carriers may be useful for delivery paths having any length. For example, the carrier(s) 10 traveling along the delivery path 14 may undock from the transit vehicle 26 at a third transit link 38. In some embodiments, the carrier(s) 10 may then head toward a storage hub 40 located near transit link 38 and substantially near and/or along the delivery path 14. Although the storage hub 40 is shown in FIG. 1 as being located nearer to the destination zone 20 than to the origin zone 18, storage hubs may be located anywhere along the delivery path 14—such as near the beginning, middle, or end of the delivery path 14. Additionally, the delivery path 14 may include any suitable number of storage hubs. Accordingly, FIG. 1 also shows an empty storage hub 42 located near the origin zone 18.

The storage hub(s) 40 may also be located at any suitable parking facility, such as a parking lot, parking structure, a "park and ride" area, and/or a substantially empty lot along a multi-use or bike path 44. In some embodiments, the multi-use and/or bike path may need to be widened to accommodate the storage hub(s) 40. However, some multi-use and/or bike paths may include sufficient right-of-way to where this may be accomplished without incurring substantial expenses. Accordingly, the storage hub(s) 40 may essentially create a portable warehouse anywhere that multiple carriers may be parked, without requiring additional construction or labor costs. However, parking facilities may be specially built and/or designated for carrier use. For example, as shown in FIG. 1, a plurality of carriers 10 may form the storage hub 40 by parking at a facility—such as a "park and ride" area—located near the transit link 38. In some embodiments, the storage hub 40 may have a particularly large footprint during nights and weekends when the "park and ride" area is typically underutilized. The carriers 10 may then collectively vacate the storage hub 40 during early mornings before commuters arrive. In such embodiments, the carriers 10 may optimize the underutilized space in a parking facility in a similar fashion to optimizing the underutilized space on transit vehicles.

Storage of the material(s) 12, the carrier(s) 10, and/or load transporters at the storage hub 40 may be particularly beneficial where the storage hub 40 is located near the destination zone 20. In some embodiments, the storage hub 40 may serve as a decentralized or local storage site for the material(s) 12 that have transported away from the origin zone 18 and toward the destination zone 20. Additionally, the storage hub 40 may serve as a portable warehouse for materials that may not necessarily be contained within carriers. For example, a carrier 10 may deposit a pallet of materials within the storage hub 40, and then leave the storage hub 40 to retrieve additional materials to deposit within the storage hub 40. In such embodiments, the storage hub 40 may or may not include overhead coverings and/or walls to protect the materials. In some embodiments, the materials may be enclosed in one or more containers for protection from theft, vandalism, and the natural elements. Additionally, in some embodiments, customers may be able to access the material(s) 12 directly from the containers. However, other embodiments may not require the use of containers, depending on the needs of the particular materials.

Additionally, it may be desirable for some embodiments to include an additional storage hub 42 located near the origin zone 18. In such embodiments, load transporters may deliver the material(s) 12 onto and/or into the carrier(s) 10 at the storage hub 42 during the "first mile" of delivery, so that the carrier(s) 10 may then deliver the material(s) 12 onto and/or into the transit vehicle 26 at the transit link 24. In the context of the present disclosure, the first mile may refer to movement of the material(s) 12 from any suitable materials-distributor (such as but not limited to a retailer) to a delivery service or other entity who may transport the material(s) 12 to their final destination. For example, a load transporter, traveling at any suitable speed, may transport the material(s) 12 to the first storage hub near the origin zone 18 during the first mile of delivery. A carrier 10 may then receive the material(s) 12 from the load transporter to thereby transport the material(s) 12 at the slow- and low-traffic areas closer to the transit link(s). In other words, the storage hubs may serve as an interface between carriers and load transporters. Load transfers between the transporters and carriers may be automated and/or human-assisted.

The storage hubs 40 and/or 42 may be also used for storing, swapping carrier batteries, and/or charging one or more carrier(s) 10 that may be used in the delivery process. Accordingly, the storage hubs 40 and/or 42 may include at least one carrier charging station 46 that the carrier(s) 10 and/or other electric vehicles may use to recharge their batteries. Other embodiments may include no charging stations, or only one charging station 46. In embodiments having charging stations, the carrier(s) 10 having lower battery levels may have higher charging priority than the carrier(s) 10 having higher battery levels. In fact, the carrier(s) 10 may form a queue at the charging stations 46. Any fully charged carrier(s) 10 may then move aside to allow other carrier(s) a turn at the charging stations 46. Additionally or alternatively, embodiments may include a battery-swapping station 48 where a drained carrier battery may be exchanged with a fully (or partially) charged carrier battery. The swapping of batteries may be achieved autonomously and/or with human assistance.

In some embodiments, the organization and movement of the carrier(s) 10 may be accomplished by using the server 16, which may be centralized, to control the movement and configuration of the carrier(s) 10 within the storage hubs 40 and/or 42. For example, the server 16 may be configured to move the carriers 10 individually and/or collectively—such as by "rows" or "columns." This type of movement may enable the carriers 10 may be tightly packed within the storage hubs 40 and/or 42, without the need for aisle ways, and to save space. Aisle ways may be created, as needed, such as by moving rows and or columns of carriers. In other embodiments, however, the organization and movement of the carrier(s) may be accomplished using other suitable means, such as but not limited to using a computer to organize and move the carrier(s) 10 individually or as a group. While moving, the carriers 10 may use lights to signal at least a direction of movement. In some embodiments, the carriers 10 may also use lights to signal that the carriers 10 have registered that pedestrians are nearby—to ensure that pedestrians feel reasonably safe while sharing space with the carriers 10. Of course, the carriers 10 need not be stored in a rectangular configuration as pictured in FIG. 1. Rather, the carriers 10 may be configured in any suitable formation or combination of formations. In some embodiments, the carriers 10 may also be stored within the storage hubs 40 and/or 42 on multiple levels, such as in multilevel parking structures in which the carriers 10 may park.

Additionally, the server 16 may organize and move the carrier(s) 10 within the storage hubs 40 and/or 42 to promote security while providing customers, vendors, employees, and other authorized individuals with access to selected carriers 10 as needed. For example, carriers having higher-value materials contained therein may be packed in the center of a group of carriers—thereby making it more difficult for thieves and vandals to access those materials. To accomplish this, the server 16 may have access to data regarding the materials contained within each carrier. This data may include, without limitation, how valuable the materials may be and/or what time the materials must be delivered by. The server 16 may then enclose higher-value but lower-delivery-priority materials toward the center of a cluster of carriers 10 for optimal security. In some embodiments, the server 16 may have access to this data prior to the carriers 10 arriving at the storage hubs 40 and/or 42. Accordingly, the server 16 may determine pre-designated spots for each carrier 10 based on the value and priority of the material(s) 12 contained therein. Likewise, the network may have access to battery levels of the carriers 10 so that the network can determine pre-designated spots for the carriers along the charging station(s) 46. The carrier(s) 10 in communication with the network may then automatically park at their pre-designated spots within the storage hubs 40 and/or 42.

Additionally, in some embodiments, the carriers 10 having camera sensors may serve as automated security guards for the materials 12 stored therein—thereby reducing or eliminating security concerns and labor costs. The carriers 10 may accomplish this by keeping their environmental sensors active while the carriers 10 are parked within the storage hubs 40 and/or 42. To save battery life, these camera sensors may only turn on when the carriers 10 sense any suspicious movement and/or lingering of any entities near the carriers. By being in communication with the server 16, the carriers 10 may then provide alerts when theft and/or vandalism appear imminent. Furthermore, the carriers 10 may even serve to prevent theft and/or vandalism by turning on their lights and/or alarms—or even mobilize to trap the culprit—such as in situations where a thief has attempted to pry open a carrier and/or container containing the material(s) 12. And, by storing the material(s) 12 within the carrier(s) 10, the material(s) 12 may be insulated from theft and poor weather conditions without requiring the storage hubs 40 and/or 42 to include walls or overhead coverings. Other embodiments may, however, include security personnel, walls, and/or overhead coverings as needed—particularly where the carriers and/or containers may not fully enclose the materials contained within.

Although FIG. 1 shows only two storage hubs, other embodiments may include any number of storage hubs. Overall, the storage hubs 40 and/or 42 may make delivery more efficient by reducing reliance on large warehouses, and providing for convenient storage of materials along or near the delivery path 14. Additionally or alternatively, the storage hubs 40 and/or 42 may serve as a pickup point where customers may retrieve their materials directly from the carrier(s) 10 such as while commuting to and/or from work. And, in embodiments where the storage hubs 40 and/or 42 are located near commuter parking, there may be an added benefit of customers not having to manually carry their material(s) 12 long distances.

EXAMPLES, COMPONENTS, AND ALTERNATIVES

The following sections describe selected aspects of exemplary systems and methods for materials delivery. The examples in these sections are intended for illustration and are not intended to limit the entire scope of the present disclosure. Additionally, each section may include one or more distinct inventions, contextual information, functions, and/or steps.

2. Exemplary Methods

This section describes how exemplary systems and methods for materials delivery may be implemented, according to aspects of the present teachings. See FIGS. 2-3.

Figure 2:
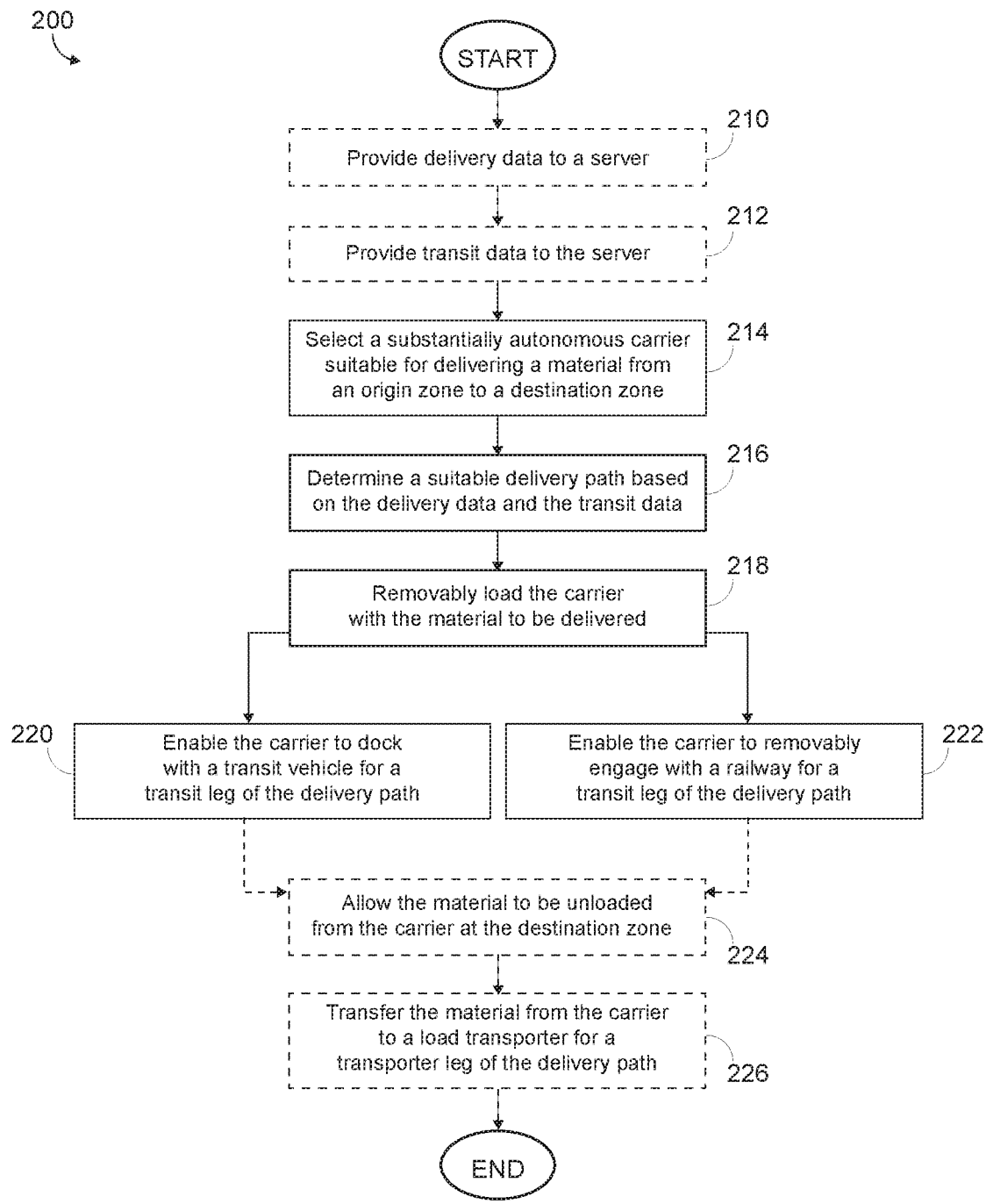
FIG. 2 shows a flowchart depicting the steps of an intermodal and at least partially automated method of delivering materials, according to aspects of the present teachings. Optional steps are shown in dotted lines.

FIG. 2 shows a flowchart depicting a broad overview of the steps that may be involved in implementing an exemplary method 200 of delivering materials, according to aspects of the present teachings. Although the following steps are described using the terms "first," "second," "third," and so on, the steps may be performed in any suitable order, and certain steps may be repeated as necessary and/or desired to carry out the present teachings. In some embodiments, a first step 210 of the method 200 may be providing delivery data to a server. A second step 212 of the method 200 may be providing transit data to the server. A third step 214 of the method 200 may then be selecting a substantially autonomous carrier suitable for delivery of a material from an origin zone to a destination zone. For embodiments including a transporter leg, a suitable load transporter may also be selected during this step. A fourth step 216 of the method 200 may be determining a suitable delivery path based on the delivery data and transit data provided to the server. A fifth step 218 of the method 200 may be removably loading the carrier with the material to be delivered.

Next, the method 200 may entail, alternatively, a sixth step 220 of enabling the carrier to dock with a transit vehicle for a transit leg of the delivery path. For example, the carrier may dock with the transit vehicle to deposit materials (or a container thereof) onto the transit vehicle and/or to board the transit vehicle. An alternative sixth step 222 of the method 200 may be enabling the carrier to removably engage with a railway for a transit leg of the delivery path. For example, the carrier may move along the railway independently of the transit vehicle and/or removably attach to the transit vehicle much like a trailer. A seventh step 224 of the method 200 may then be allowing the material to be unloaded from the carrier at the destination zone. In some embodiments, an optional eighth step 226 of the method 200 may be transferring the material from the carrier to a load transporter for an optional transporter leg of the delivery path. As noted above, certain steps may be repeated as desired. Therefore, the foregoing steps may describe a first leg of transportation, whereas a second or subsequent legs may continue after a transporter leg, wherein the process may begin again, for example beginning at step 218 described above. The dotted lines of FIG. 2 indicate optional steps. Additionally, the delivery method may include the use of more than one transit system across more than one city. The exemplary method of FIG. 2 is described in more detail below.

Figure 3:
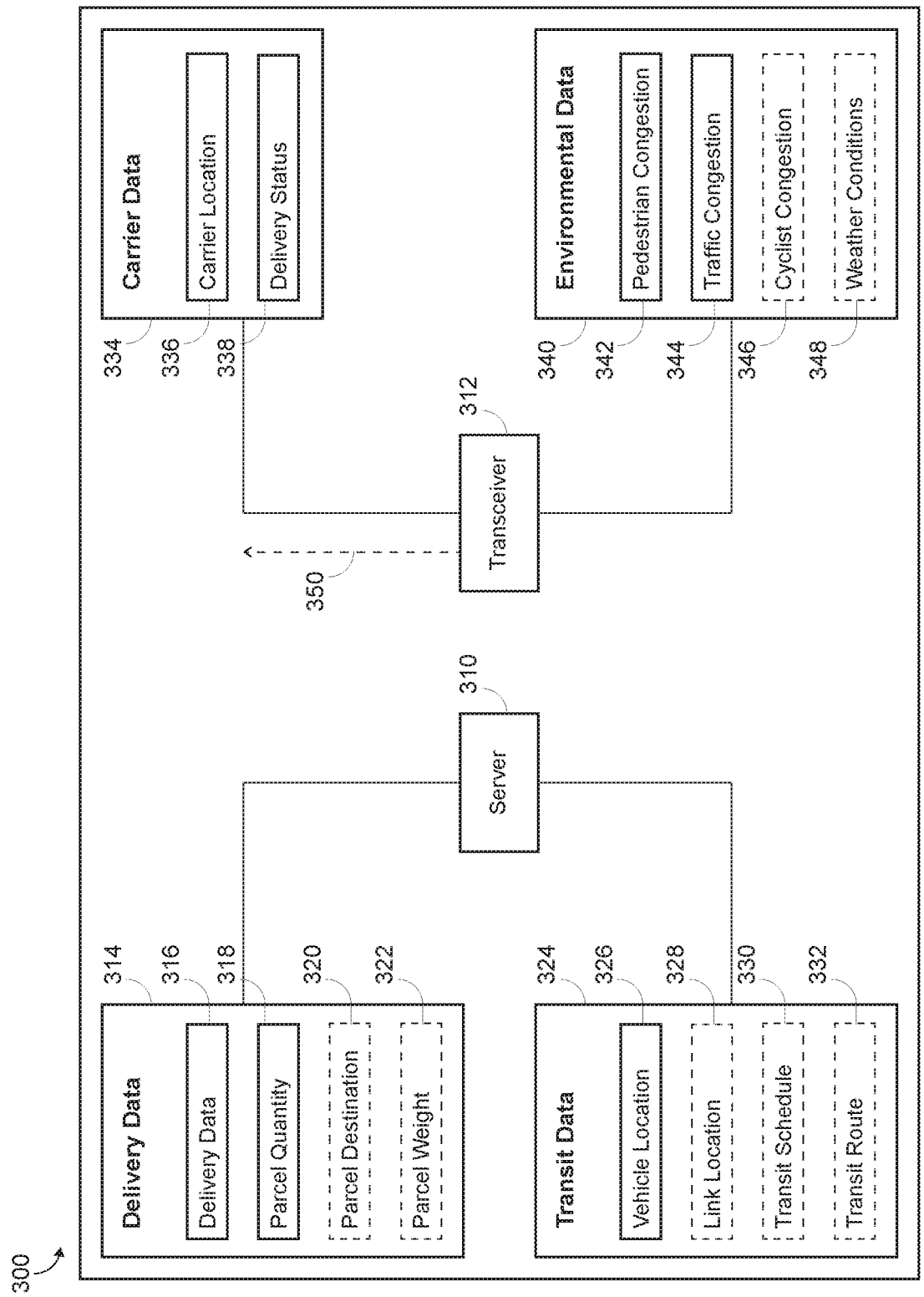
FIG. 3 shows a schematic depicting transfer of data within a network of FIG. 2, according to aspects of the present teachings.

FIG. 3 shows a data network 300, indicating data that may be transferred when implementing the method 200 to deliver one or more parcel(s), according to aspects of the present disclosure. The network 300 may be continuous and cloud-based, and/or sporadic such as by using devices that communicate based on proximity to each other. In some embodiments, the network 300 may be configured by manually entering data into the network. As shown in FIG. 3, the network 300 may include a server 310 communicatively connected with a carrier transceiver 312 of the carrier. To implement step 210 of the method 200, a delivery service may provide delivery data 314 to the server 310 in the form of a delivery request. The delivery data 314 may include information about the delivery, such as but not limited to parcel identification data 316 (i.e., data sufficient to identify the parcel(s)), a parcel quantity 318 (i.e., how many parcels are to be delivered), a parcel destination 320 (i.e., a location to where the parcel(s) are to be delivered), and a parcel weight 322 (i.e., how much the parcel(s) weigh). Other data may include, without limitation, the number of cubic inches of a parcel, and a parcel delivery window. Depending on the details of the delivery request, some situations may require a load transporter to pair up with the carrier for the first- and/or last-mile portion of the delivery path.

Additionally, to implement step 212 of the method 200, a transit agency—or more than one transit agency—may provide transit data 324 to the server 310. The transit data 324 may include information about the transit system to be used during the transit leg of the delivery path, such as but not limited to a transit vehicle location 326 (i.e., where a suitable transit vehicle may be located), a transit link location 328 (i.e., where a suitable transit link may be located), a transit schedule 330 (i.e., when and where a suitable transit vehicle will be traveling), and a transit route 332 (i.e., which path a suitable transit vehicle will be traveling along). For example, the transit vehicle location 326 may be useful data such that a carrier may facilitate a rendezvous with the transit vehicle within seconds of its arrival at a transit link, to thereby minimize or eliminate dwell time at the transit link. Suitability of any particular transit vehicle may be determined based on whether there is adequate space on the transit vehicle to handle the delivery load, whether the transit infrastructure can handle the delivery request without delaying commuters, and other such logistical questions. In some embodiments, space on a transit vehicle may be reserved for parcels and/or carriers by using an interactive map, similar to how an airline passenger may select and reserve seats aboard an aircraft.

Further, to implement step 214 of the method 200, a computing device or, more specifically, a computer control system may select a suitable carrier for delivering the parcel(s) based on the delivery data 314 and/or the transit data 324. Suitability of any particular carrier may also be determined based on whether there are a sufficient number of carriers available to handle the delivery request, whether the carrier(s) are adequately charged to complete delivery, and similar logistical questions. Depending on the specificity of data provided, the computer control system may also be capable of prioritizing and otherwise organizing carrier dispatch based on unique delivery needs, including factors such as but not limited to which parcel(s) may require rush delivery and/or special handling, and/or which parcel(s) may require a load transporter to complete first- and/or last-mile delivery.

In general, the computer control system may be responsible for managing delivery by selecting which parcel(s) are to be delivered and how, determining delivery schedules, determining which transit vehicles may be used for delivery, setting procedures for loading and unloading of parcel(s), directing the dispatch of carriers, directing the docking of carriers with transit vehicles, and/or organizing the storage of parcel(s) and carrier(s). In some embodiments, the computer control system may be able to ensure that the carrier(s) reach the appropriate transit link(s) with sufficient time to dock with the transit vehicle(s), as well as ensure that one or more load transporter(s) meet with the carrier(s) at appropriate transit link(s) so that delivery is completed on time. In some embodiments, the delivery would be accomplished without disrupting the flow of traffic, commuters, bikers, pedestrians, or transit vehicles. Rather, the computer control system may be able to regulate the delivery of parcel(s) in response to which transit vehicles are available at suitable times of day—such as when transit ridership levels are low and/or when load transporters are available to complete first- and/or last-mile delivery.

The computer control system may also select a suitable transit vehicle and/or load transporters based on a plurality of vehicle and/or load transporter values (similar to using a point system), including at least an economic value, an environmental value, and a public value. Exemplary economic values may include, without limitation: labor costs, speed of travel, costs per mile traveled, maintenance costs, infrastructure costs, capacity for delivering high volumes of materials, capacity for heavy loads of materials, and/or level of autonomy with respect to loading and unloading materials to and from the carrier. Exemplary environmental values may include, without limitation: clean energy use, fuel efficiency, ability to reduce traffic congestion, and/or promoting transit use. Exemplary public values may include, without limitation: low noise levels, safety due to low speed movement, safety due to smaller size, level of bike-friendliness, level of pedestrian-friendliness, and level of damage to roadways.

In some embodiments, the key to fostering each value may be closely related to which type of transit vehicle is selected. For example, light rail vehicles may embody many of the above values and therefore be preferred for delivery. Specifically, light rail vehicles may use clean energy, enjoy low friction, include low floors that may enable easier carrier docking, and transit links may be located near origin zones (i.e., airports, malls, and other suitable dispatch centers). However, other vehicles may also exemplify these values, such as but not limited to shuttle buses, autonomous trucks, cargo bikes, rideshare vehicles, and/or pedicabs. Street cars, for example, have similar benefits to light rail vehicles—such as low friction. Certain buses may also have similar benefits—particularly buses using clean energy. Ultimately, the computer control system may select whichever vehicle(s) are best-suited for the particular delivery request. In some embodiments, the vehicle and/or load transporter values may be useful for generating environmental and/or economic reports that may be required by government agencies, investors, and so on.

In some embodiments, it may be useful to communicate certain responsive data to the delivery service and/or transit agency. For example, responsive data sent to the delivery service may include delivery information such as but not limited to a confirmation or denial of the delivery request, confirmation details, a time of dispatch, and/or an estimated time of delivery. And, data sent to the transit agency may include vehicle data such as but not limited to whether space has been reserved within a suitable transit vehicle, where a suitable transit vehicle may be located, and/or whether a suitable carrier has been dispatched on a delivery path. Furthermore, the carrier(s) may transmit the carrier data 334 to the server 310, including but not but not limited to a carrier location 336 (i.e., where the carrier is located) and a delivery status 336 (i.e., whether delivery is complete and/or if there are any delays). Based on the carrier data 334, a delivery service, transit agency, and/or a customer may track the progress of delivery. For example, delivery progress may also be communicated to a customer via a smart device application.

Based on the delivery data 314 and the transit data 324, a computer system may be able to compute a suitable delivery path in order to move the parcel(s) from the origin zone to the destination zone. In some embodiments, environmental data 340 may also be useful in computing the delivery path. Specifically, the carrier(s) may communicate the environmental data 340 to the server 310 to thereby re-compute the delivery path in real time and as necessary. The environmental data 340 may include information such as but not limited to pedestrian congestion 342, traffic congestion 344, cyclist congestion 346, and/or weather conditions 348. The carrier(s) may then use the environmental data 340 to safely navigate along the delivery path. For example, a predetermined delivery path may no longer be optimal due to unforeseen circumstances, such as a roadblock due to a car accident. In that situation, a carrier may be able to detect the traffic congestion and re-compute the delivery path to enable the carrier(s) to take an alternative route and thereby complete delivery on time. In such embodiments, the carrier may communicate the re-computed delivery path to the server in real time, to enable tracking of the carrier(s) and parcel(s) as within usual parameters.

In some embodiments, the computer system may also be involved in the continuous monitoring of the carrier(s) and parcel(s), such as but not limited to the purposes of averting vandalism, theft, and/or delay of movement. This may be accomplished by using the environmental sensors of the carrier(s) and/or by human assistance—such as where a human monitors the carrier(s) in real time, to ensure safety and on-time deliveries. For example, in some embodiments, the camera sensors of a carrier may generate images indicating to a monitor that the carrier may require repairs, repositioning, or other assistance. In that situation, the monitor may use the computer system to troubleshoot the carrier remotely, and/or dispatch a proper authority to apprehend a thief or vandal.

In some embodiments, the network 300 may include exchange of data between carrier(s) (in addition to the exchange of data between carrier(s) and the server). The exchange of data between transceivers of different carriers is indicated by the dotted line 350 in FIG. 3. Accordingly, carrier(s) may be able to assist each other where required. For example, a first carrier may be experiencing technical difficulties at a certain location along the delivery path, such as a low battery. The first carrier may then communicate its low-battery status to other networked carriers, for the purpose of obtaining assistance from a suitable second carrier. A suitable second carrier may be one that is close in proximity and has the capacity to, for example, receive a delivery load from the first carrier to thereby complete the first carrier's deliveries, tow the first carrier to a nearby storage hub for re-charging, and/or otherwise assist the completion of delivery. In other words, the data network 300 may be used not only to organize deliveries, but also to ensure the safety and security of the carrier(s) and parcel(s) moving within the delivery system.

Additionally, as ecommerce grows, the expense and inefficiency of such transport may become increasingly frustrating to customers, who may expect same- or two-day delivery for their pre-ordered goods at low shipping prices. Likewise, customers may demand increased transparency while tracking the movement of their goods. Specifically, tracking codes that merely provide statuses every few days—such as when a parcel is sent out for delivery, when a parcel reaches a post office in a different state, and when a parcel is out for delivery—may no longer satisfy customers. Instead, customers may want to have full, real-time knowledge of where their parcels are located and when their parcels will arrive. Such knowledge is particularly useful for the delivery of a high-value parcel, which often requires a signature. Instead of having to wait at home for six (6) hours to be able to sign for a parcel, a customer may want to be able to track the exact location of their parcel using a smart phone application so she can go home and sign for the parcel as needed and during a specified pickup time.

Such smart phone applications may be similar to rideshare applications having digital maps that show exactly where a driver is located, in which direction(s) the driver is traveling, and an estimated time of arrival for the driver. Similarly, a delivery application may show exactly where a parcel is located, in which direction the parcel is traveling, and an estimated time of arrival of the parcel. Customers may also receive a text message or phone call when their parcel arrives at its final destination. In addition to allowing passengers to track their parcels, such smart phone applications may also enable customers to retrieve their parcels directly from the carriers in certain embodiments. For example, embodiments using a storage locker system for parcel retrieval may include a barcode scanner. A customer may then present a specific barcode to the scanner, thereby opening a compartment of the carrier and allowing the customer to retrieve her parcel from within. Once a parcel is retrieved, the application may mark the delivery as complete. When in communication with the overall delivery network, the transit agency and/or delivery service may also receive a notification that the delivery is complete.

Smart phone applications may also be useful for coordinating delivery across different modes of transit. While in some embodiments, a carrier may deliver a parcel along the entire delivery path to the destination zone, it may be desirable for other embodiments to include additional load transporters to facilitate—i.e., complete—last-mile delivery. In such embodiments, a delivery driver or bicycle courier may arrange, via the smart phone application, to receive a parcel or load of parcels from a carrier so that the delivery driver or bicycle courier may complete last-mile delivery. This may be similar to how drivers are able to pick up passengers via a rideshare application, in that an operator of a load transporter may receive notifications that certain parcels need to be delivered to certain locations. In some embodiments, the parcels may appear up on a digital map of the smart phone application. The operator may then go to a transit link to retrieve the parcels from the carrier and, once retrieved, the parcels may embark on a transporter leg of the delivery path.

3. Exemplary Carriers

This section describes more specific aspects of exemplary substantially autonomous carriers, according to aspects of the present teachings. See FIGS. 4-5.

Figure 4:
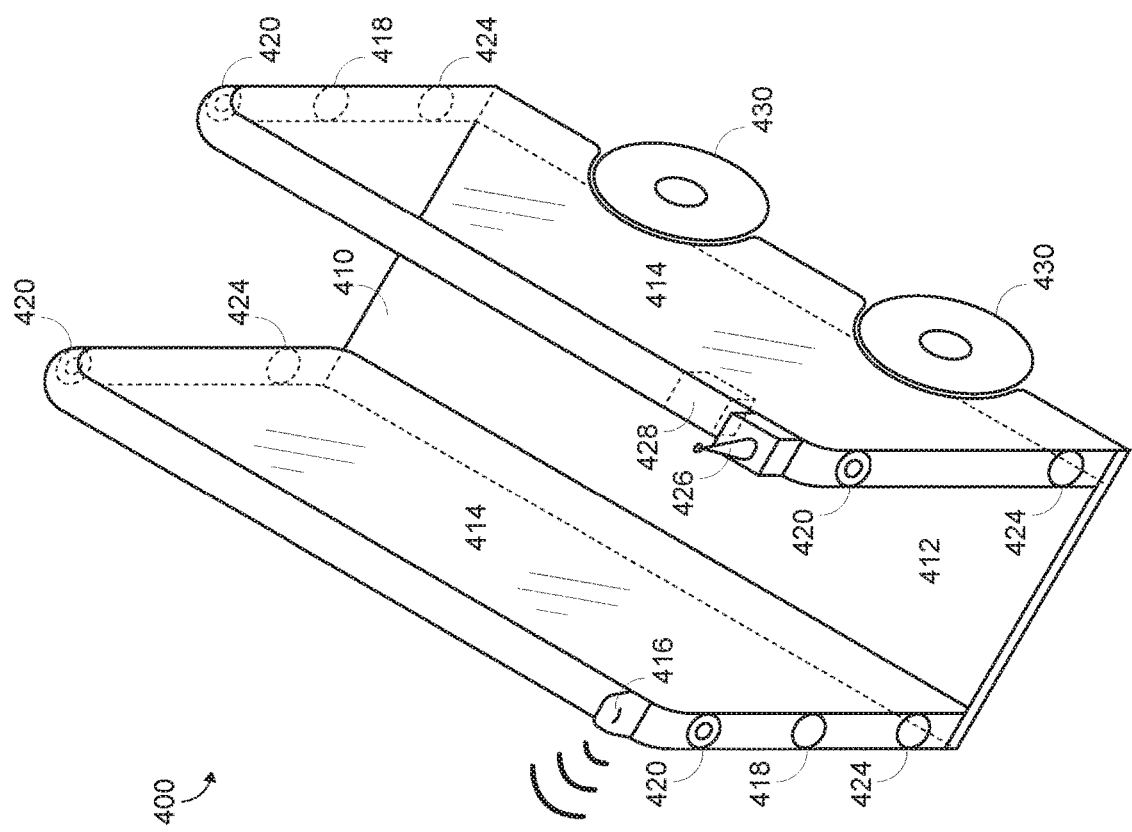
FIG. 4 shows a perspective view of the substantially autonomous carrier of FIG. 1, according to aspects of the present teachings.

FIG. 4 shows a perspective view of an empty, substantially autonomous parcel carrier 400 (corresponding to the carrier 10 of FIG. 1), according to aspects of the present teachings. The carrier 400 may be used to deliver at least one parcel (or container of parcels) from an origin zone to a destination zone, along a substantially pre-determined delivery path. In some embodiments, the carrier 400 may be similar to an autonomous mobile robot and/or other low-speed autonomous vehicles. The carrier 400 may be fully autonomous or only partially autonomous (in that it may require some human input). In some embodiments, the carrier 400 may be configured to travel at ultra-slow speeds, such as walking speeds or even slower, in order to maximize safety for pedestrians, and to minimize dwell time at transit links. Another benefit of low-speed carrier travel may be reduced costs compared to autonomous vehicles moving during peak daytime traffic, at freeway speeds, and in complex traffic situations. That is, the cost burden may be lower to create low-speed autonomous vehicles as opposed to high-speed autonomous vehicles. However, the carrier 400 may be capable of traveling at higher speeds in some embodiments. Yet another benefit of low-speed carrier travel may be a lesser need for research and development compared to that required by high-speed carriers.

Additionally, having a reduced size may enable the carrier 400 to have a small turning radius, such as by using wheel hub motors that allow for "0" turns. The carrier 400 may also be suitable for maneuvering narrow pathways and transit platforms, without substantially impeding the normal traffic in those areas. Higher levels of safety may be achieved by limiting movement of the carrier 400 to times of day when pedestrian, cyclist, and other such traffic is low. In some embodiments, movement of the carrier 400 may be separated from pedestrian movement such as by restricting the carrier 400 to specific carrier lanes (similar to clearly-marked and designated bicycle lanes along roadways).

Furthermore, the carrier 400 may be an ultra-small vehicle that may or may not accommodate driver(s) and/or passengers. In other words, the carrier 400 may be a driverless or robotic car. Such embodiments may be beneficial for maximizing the space capacity within a carrier body 410 of the carrier 400, such that it can contain a large number of parcel(s) and/or parcel(s) of large sizes. As shown in FIG. 1, the carrier 400 may be configured specifically for fitting as many materials as possible therein. More specifically, the carrier 400 may include a platform 412 and one or more sidewalls 414. Although the carrier 400 is not shown to be fully enclosed, other embodiments may include carriers with additional sidewalls, a roof, a door, and/or any other structures suitable for removably securing materials therein. Other embodiments may not include any sidewalls at all.

Additionally, the carrier 400 may include a plurality of environmental sensors, including but not limited to at least one LIDAR sensor 416, at least one RADAR sensor 418, and/or at least one camera sensor 420. The carrier 400 may use any single type or combination of sensors. These sensors may be suitable for detecting, anticipating, and/or recording potential impacts, theft, and vandalism to the carrier 400. The sensors may also be capable of mapping the environment around the carrier 400 so that the carrier 400 may stop and/or change course to avoid potential impacts. Accordingly, the sensors may be useful for ensuring the safety and security of the carrier 400 and the parcel(s) contained within. The carrier 400 may also include a plurality of lights 424, which may be configured to indicate a direction of travel, a change in the direction of travel, and/or a deceleration of the carrier 400. The lights 424 may be useful for the safe navigation of pedestrians, cyclists, and other vehicles that may share roadways, multi-use paths, bike paths, transit platforms, and/or sidewalks with the carrier 400.

In some embodiments, the carrier 400 may also include a carrier transceiver 426 configured to communicatively connect with the server 310 of FIG. 3, receive the delivery data 314 and the transit data 324 from the server 310, and transmit the carrier data 334 to the server 310. Likewise, the transceiver 312 may be suitable for transmitting the environmental data 340 that the carrier may obtain from its sensors to the server 310. In some embodiments, the carrier transceiver 426 may be configured to share information with transit vehicles, such as but not limited to a position, speed, and/or direction of travel of the carrier 400. The sharing of information between the carrier 400 and a transit vehicle may be particularly useful for enabling the precise and removable docking of the carrier 400 with the transit vehicle, as well as to reduce carrier congestion at and near transit links.

The carrier 400 may also include a computing device or, more specifically, a navigation control 428 that is operatively connected to the transceiver 426. The navigation control 428 may in turn include a memory and a processor configured to receive at least the environmental data from the sensors of the carrier 400, compute the delivery path based on the delivery data 314, the transit data 324, and the environmental data 340. Similarly, the navigation control 428 may be configured to re-compute the delivery path in real time based on at least the environmental data 314, such as where traveling along the original delivery path may no longer be feasible and/or desirable. The navigation control 428 may also be configured to determine at least one safety parameter based on the environmental data 314, such as by slowing down the movement speed of the carrier 400 when pedestrians are nearby. In some embodiments, the carrier 400 may also be capable of conveying an audible signal to alert pedestrians of its position, such as but not limited to by beeping when moving in reverse. The carrier 400 may also include an audible and/or visible alarm system suitable for deterring vandalism and/or theft.

Additionally, although FIG. 4 shows the carrier 400 having at least two wheels 430, carriers according to the present disclosure may include any number of wheels suitable to enable stable movement of the carrier 400 along the delivery path. Accordingly, some embodiments may include three wheels, whereas other embodiments may include only one wheel. In embodiments having only one wheel, the wheel may encompass the entire carrier body such that the carrier may "roll" along the delivery path (see, e.g., the carrier of FIG. 6). In some embodiments, the carrier 400 may include omni wheels or mecanum wheels that enable the carrier 400 to make tight turns. Additionally, some embodiments may include at least one wheel configured to removably engage directly with a railway, thereby enabling the carrier to travel along the railway during a transit leg of the delivery path. Such embodiments may, for example, include metal wheels similar to those of a railway car and be suitable for reducing the amount of friction generated between the wheels of the carrier and the railway.

Figure 5:
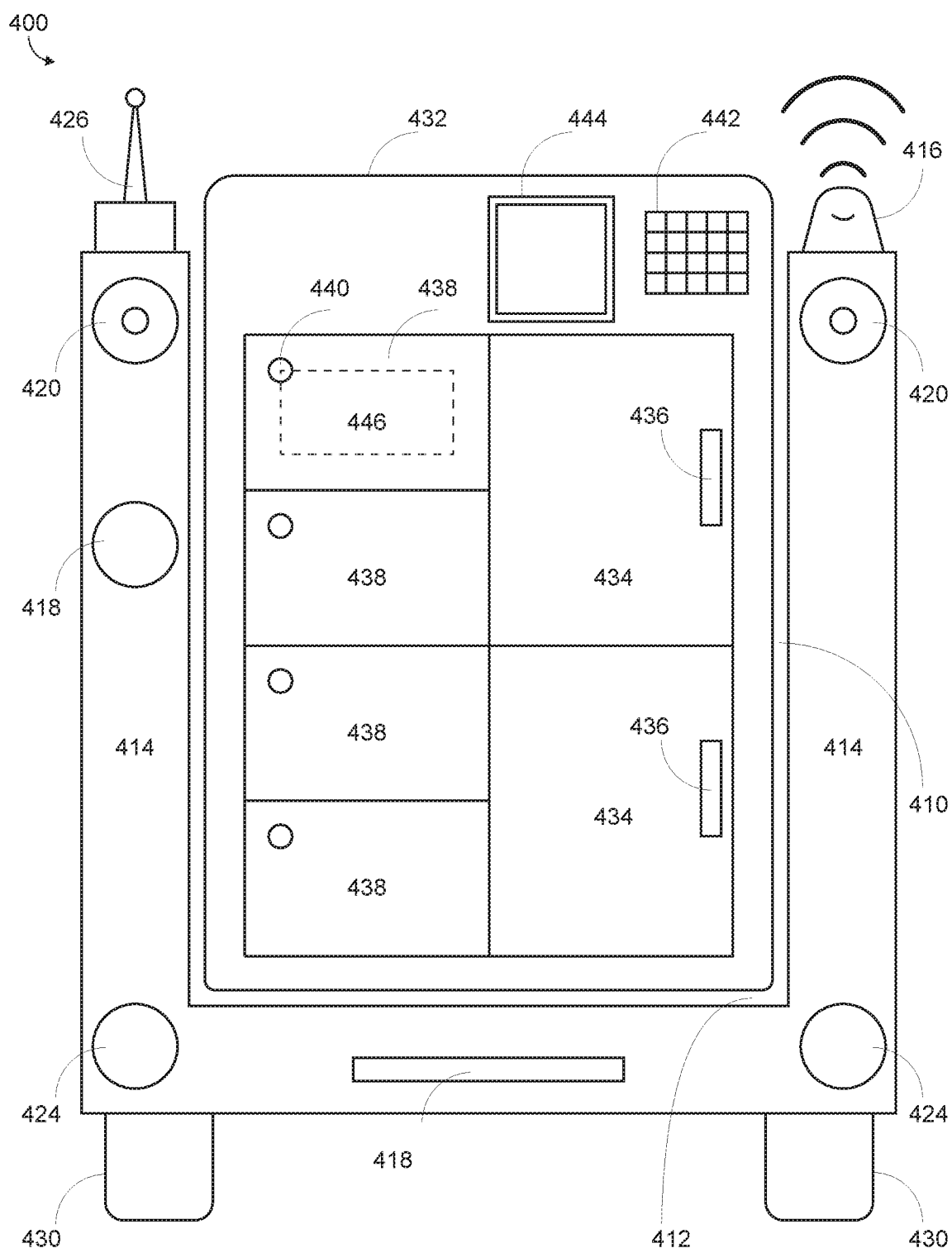
FIG. 5 shows a rear view of the substantially autonomous carrier of FIG. 4, according to aspects of the present teachings.

FIG. 5 shows a rear view of the same carrier 400 of FIG. 4, but including an exemplary storage container 432, according to aspects of the present teachings. As shown in FIG. 5, the storage container 432 may be configured to fit inside of the carrier body 410 and on top of the platform 412. In some embodiments, the storage container 432 may be built into the carrier 400; however, the storage container 432 may be removable from the carrier 400 in other embodiments. The storage container 432 may include one or more compartments 434, which may be openable using any suitable mechanism, such as but not limited to one or more handles 436. In some embodiments, the handle(s) 436 may not be necessary. Alternatives may include—without limitation—knobs, buttons, slots, and/or electronic releases that may not require any external structure. For example, as shown in FIG. 5, certain compartments 438 may include a keyhole 440 usable by delivery personnel. Additionally or alternatively, a customer may access her parcel(s) directly from the carrier 400 similar to using a storage locker system. In such embodiments, the storage container 432 may also be referred to as a vending container.

For example, each compartment may contain any number of parcel(s) that may be delivered to a particular customer or to different customers. In some embodiments, one or more compartments 434 and/or 438 of the carrier 400 may be configured to enable removal of the parcel(s) upon providing suitable parcel access data to the carrier 400. It may be useful for each compartment 434 and/or 438 to contain only parcel(s) to be delivered to a specific customer who is authorized to open that compartment, to avoid the problem of customers removing the wrong parcel(s). The parcel access data may be in the form of an alphanumeric code and/or barcode that can be input via a keypad 442 or a scanning device 444. For example, the scanning device 444 may be suitable for reading a barcode and/or credit card associated with a particular parcel and/or compartment, so that the carrier 400 may open the correct compartment to allow access to that parcel. Alternatively or additionally, the scanning device 444 may be configured for facial and/or fingerprint recognition.

For example, some embodiments of the carrier 400 may serve as a portable vending machine such that customers may remove any suitable goods—such as bike repair accessories, snacks, refreshments, or even fresh groceries—from the compartments 434 and/or 438 while commuting, on the go, at transit links, in parking facilities, along multi-use or bike paths, and/or wherever carrier 400 may be parked. In such embodiments, the compartments 434 and/or 438 may include menus and/or viewing windows so that customers may see which goods are available for purchase. Customers may then select their goods using the keypad 442 and/or a smart phone application, and remove their goods after completing payment.

Although FIG. 5 show a carrier 400 including a locker system, not all embodiments may include a locker system. For example, some embodiments may include only one compartment suitable for containing parcel(s). In these embodiments, the carrier may or may not be configured to allow customers to directly access their parcels. Other embodiments may include any number of compartments that may be directly accessible by customers, in conjunction with any number of compartments that may not be directly accessible to customers. Additionally, although FIG. 5 shows the carrier 400 having covered and closeable compartments 434 and 438, other embodiments may include open compartments, much like a flatbed—particularly where the parcel(s) may not be sensitive to the open elements and/or where security of the parcel(s) may not be of concern. Some embodiments may even include closed compartments for parcel(s) of higher value that may need to be secured, in addition to open compartments for parcel(s) of lower value that may be likely to be stolen. In some embodiments, parcel(s) may be palletized and then loaded into the carrier 400.

4. Exemplary Transit Vehicles

This section describes more specific aspects of exemplary transit vehicles, according to aspects of the present teachings. See FIGS. 6-7.

Figure 6:
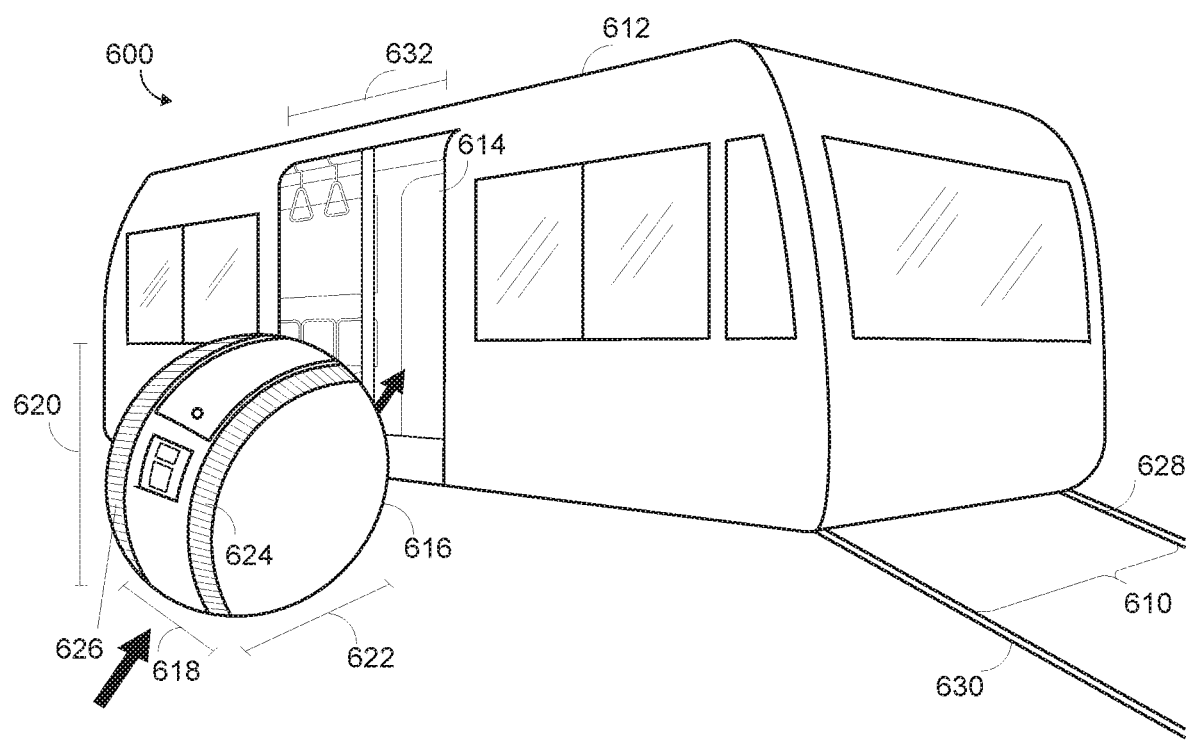
FIG. 6 shows a perspective view of a transit vehicle on a railway of FIG. 1, including a carrier capable of docking with the transit vehicle, according to aspects of the present teachings.

FIG. 6 shows a perspective and partial view of a transit vehicle 600 on a railway 610 like that of railway 30 of FIG. 1, according to aspects of the present teachings. As shown in FIG. 6, the transit vehicle 600 may include at least one railcar 612. In some embodiments, the transit vehicle 600 may include two or more railcars, however. The transit vehicle 600 may also include an opening 614 that may open and close to allow passengers to board and alight from the transit vehicle 600. However, the opening 614 may—in other embodiments—be specifically designated to allow a carrier 616 to enter and exit the transit vehicle 600 and may not suitable for passenger use. As shown in FIG. 6, the carrier 616 may have any form suitable for containing materials therein and for removably docking with transit vehicles, and therefore may not necessarily be shaped like a traditional car.

Additionally, in some embodiments, the carrier 616 may be configured to removably dock with the transit vehicle 600, at the opening 614, to deposit materials therein. For example, the carrier 616 may include a lifting member configured to elevate the carrier 616 to a suitable level to dock with the opening 614 of the transit vehicle 600 (or with other delivery vehicles). The lifting member may also be configured to elevate the carrier 616 so that the materials may be tilted (i.e., deposited) into the transit vehicle 600. In such embodiments, it may only be necessary for the materials (and not carriers) to travel along a transit route on their way to the destination zone. However, in other embodiments, it may be useful for the carrier 616 itself to travel along the transit line. For example, the carrier 616 may include at least one wheel configured to removably engage with the railway 610 directly. More specifically, the carrier 616 may include a first wheel 624 and a second wheel 626 suitable for travel along roadways, on transit platforms, and/or upon railways. Thus, the carrier 616 may "roll" onto the railway 610 such that the first wheel 624 removably engages with a first rail 628 of the railway 610, and such that the second wheel 626 removably engages with a second rail 630 of the railway 610.

In other embodiments, the carrier 616 may not travel directly upon the railway 610 during the transit leg of its delivery path. Rather, the carrier 616 may travel within the transit vehicle 600 during the transit leg. For example, as shown in FIG. 6, the carrier 616 may include a carrier body having a width 618, a height 620, and a length 622 suitable to clear the opening 614 of the transit vehicle 600 so that the carrier 616 may board the transit vehicle 600 while the transit vehicle 600 is stopped or otherwise idle at a transit link. In such embodiments, the carrier 616 may be equipped with sufficient environmental sensors and a means of carrier-to-vehicle communication to thereby enable precise docking with the transit vehicle 600. For example, the opening 614 of the transit vehicle 600 may have a width 632 of 48 inches. Accordingly, the width 618 of the carrier 616 may be less than 48 inches. Precise docking of the carrier 616 with the transit vehicle 600 may prevent damage to the opening 614, and may obviate any need for a transit or delivery worker to facilitate the docking and/or depositing process. After docking, the carrier 616 may be configured to convey materials away from the opening 614 and along the length the railcar 612, to optimize space usage inside the transit vehicle 600.

Figure 7:
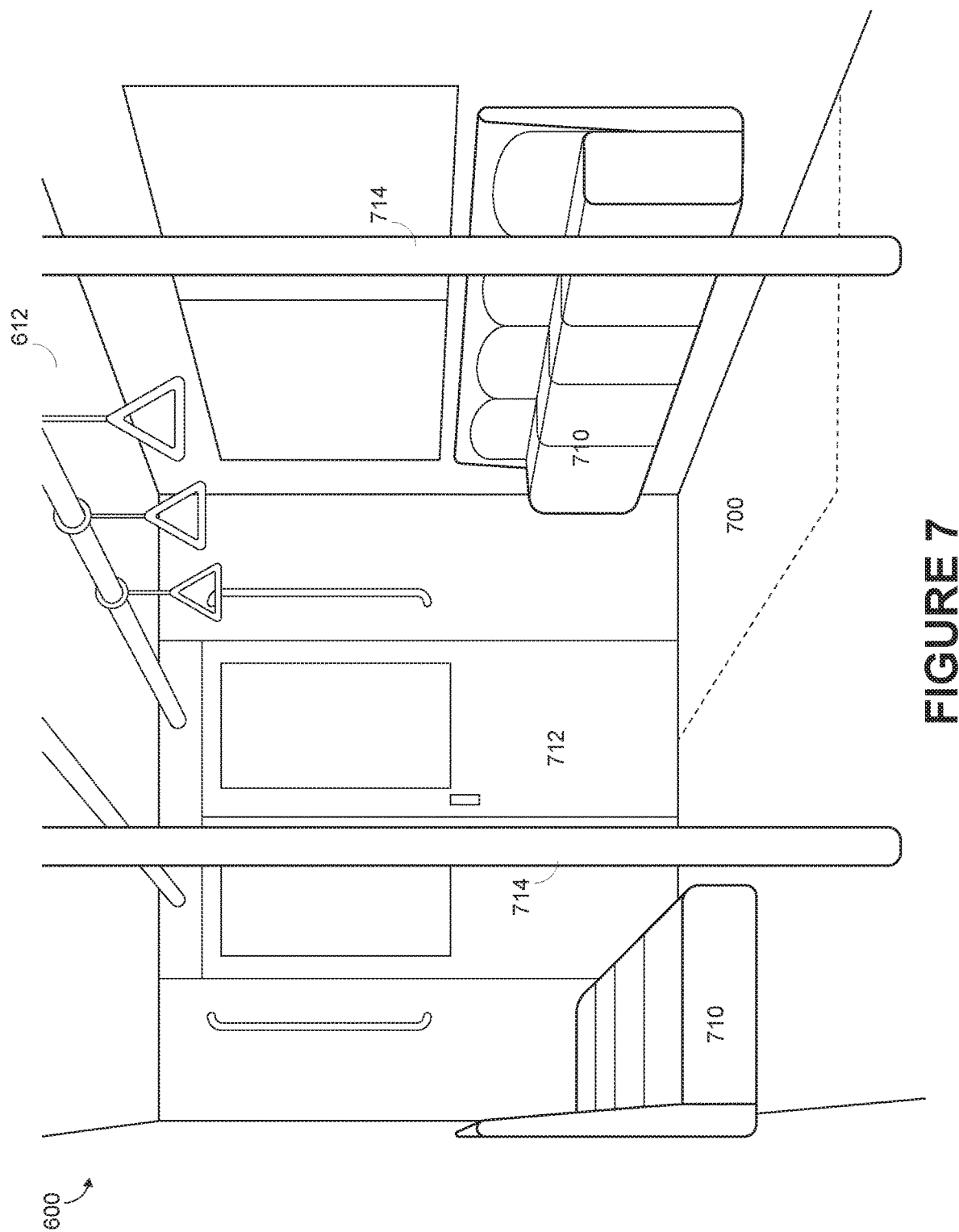
FIG. 7 shows an interior view of the transit vehicle of FIG. 6, according to aspects of the present teachings.

FIG. 7 shows an interior view of the railcar 612 of the transit vehicle 600 of FIG. 6, according to aspects of the present teachings. For embodiments in which the carrier 616 is configured to be positionable inside the transit vehicle 600, the transit vehicle 600 may have at least one designated area 700 suitable for the carrier 616 to be positioned. Additionally, the designated area 700 may be marked with a line so that any passengers sharing the railcar 612 with the carrier 616 may know to vacate the area when the carrier 616 boards the railcar 612. In some embodiments, lighting and audio may also be useful for indicating the designated area 700 to passengers. Although FIG. 7 shows only one designated area 700, embodiments may include any number of designated areas suitable for the carrier 616 to be positioned while traveling within the transit vehicle 600. Additionally, the carrier 616 may be mobile within the transit vehicle 600. In other words, a position of the carrier 616 may not be limited to the designated area 700.

In some embodiments, the transit vehicle 600 may include foldaway seats 710 that are configured to fold up to thereby make room for the carrier 616 within the designated area 700. In embodiments wherein the carrier 616 may be in wireless communication with the transit vehicle 600, the foldaway seats 710 may automatically fold up when the carrier 616 is in close proximity. In other embodiments, the carrier 616 may include a means to push the foldaway seats 710 up when positioning itself in place within the designated area 700. In yet other embodiments, a transit worker may manually move foldaway seats 710 to their stowed position. In some situations, it may be desirable for the carrier 616 to vacate the railcar 612 through an internal door 712, and occupy a second railcar of the transit vehicle 600. Such situations may arise where the transit vehicle 600 may need to accommodate additional carriers, and the carrier 616 moves further along the full length of the transit vehicle 600 to thereby make space for the additional carriers. Another situation may be where the carrier 616 vacates the designated area 700 to make space for a passenger having a wheelchair or a stroller. However, in some embodiments, one railcar of the transit vehicle 600 may be entirely designated for the carrier 616 whereas another railcar of the transit vehicle 600 may be entirely designated for passengers.

Additionally, the transit vehicle 600 may include at least one stanchion 714 that may typically be used for passengers to hold onto while riding the transit vehicle 600. Like the foldaway seats 710, the stanchion 714 may—in some embodiments—be configured to fold up or otherwise be stowed away to make space for the carrier 616 within the transit vehicle 600. In some embodiments, the carrier 616 may be securable to the stanchion 714. For example, the carrier 616 may include a support member extending from the carrier body and suitable for engaging the stanchion 714 automatically. Alternatively, the carrier 616 may be manually secured to the stanchion 714 via any suitable means, such as but not limited to by "tying" the carrier 616 to the stanchion 714 using a strap, lock, or other securing device. However, the carrier 616 may be securely positionable inside the transit vehicle 600 by any other suitable means. For example, the carrier 616 may include a parking brake or similar device configured to keep the carrier 616 in a stable position within the transit vehicle 600. Any such securing device may be disengaged when the carrier 616 is to move along and/or off the transit vehicle 600.

5. Exemplary Last Miles

This section describes more specific aspects of last-mile delivery, according to aspects of the present teachings. See FIGS. 8-9.

In the context of delivery, the term "last mile" may be used to describe the challenges in delivering materials from transportation hubs (such as but not limited to transit links, railway stations, bus depots, ferry slips, and the like) to their final destinations. Although colloquially described as the last mile, the last leg of delivery may span less than one (1) mile, more than two (2) miles, or even fifty (50) miles. Challenges of last-mile delivery may include, without limitation: cost, efficiency, and transparency. In terms of cost, last-mile delivery may account for up to approximately forty percent (40%) of delivery costs—and these costs may typically be passed down to the customer. These high costs may be caused by the complexity of urban logistics, such as where highly congested cities may restrict truck access, off-hour delivery times, pollution, and noise levels. In addition to densely-populated areas, last-mile delivery may also be challenging when the final destinations are in lower-density areas (such as but not limited to the outer edges of cities and/or rural or suburban areas), which may not be located near a transportation hub. As such, it may be expensive and inefficient for delivery trucks (e.g., transportation and maintenance costs) and workers (e.g., labor costs) to make long journeys to sparsely populated areas. Instead, it may be useful for a load transporter to complete last-mile delivery.

Figure 8:
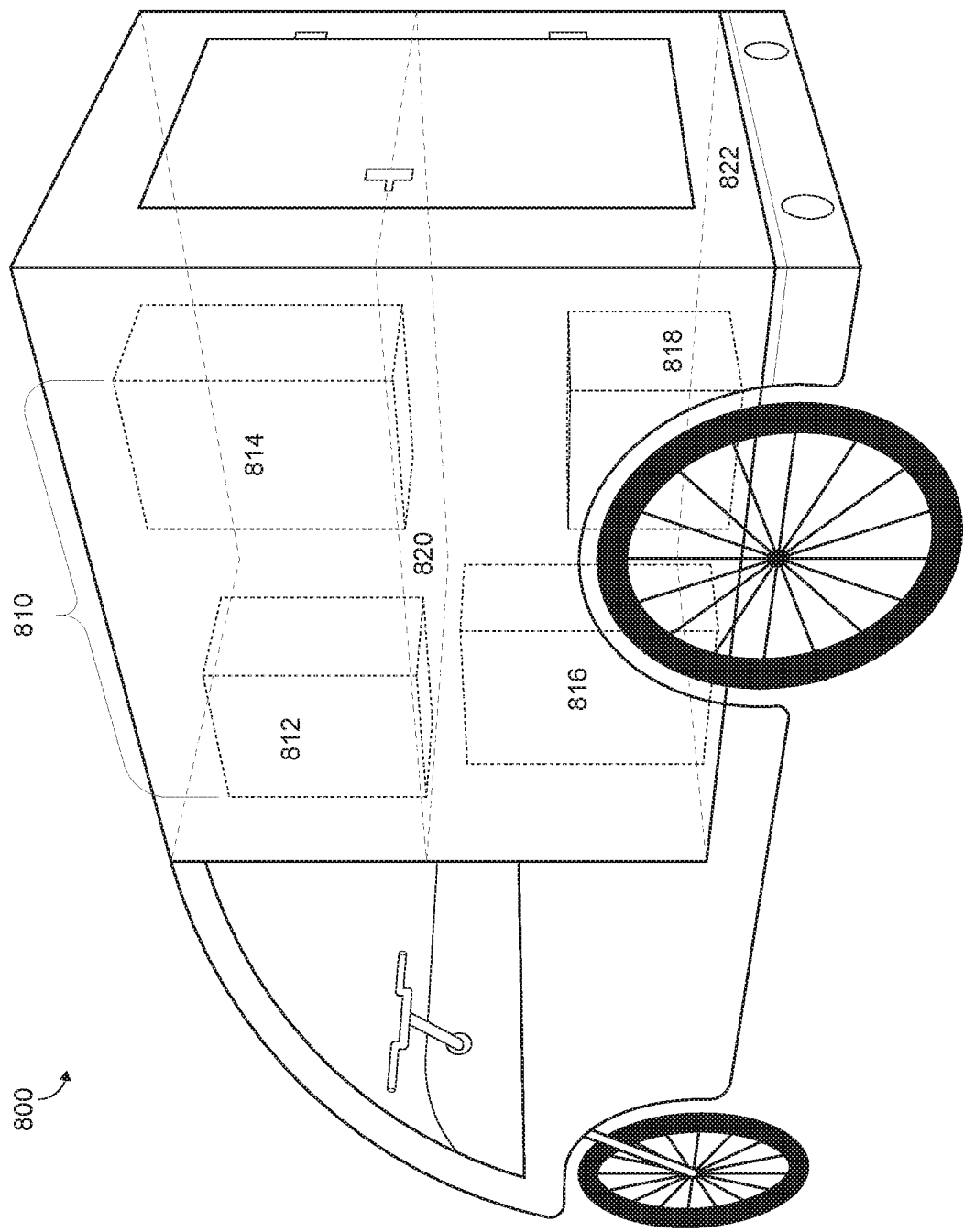
FIG. 8 shows a perspective side view of a load transporter, according to aspects of the present teachings.

FIG. 8 shows a perspective side view of an exemplary small load transporter 800, according to aspects of the present teachings. In some embodiments, it may be more cost-effective and efficient for a small load transporter 800 to complete delivery of a parcel load 810—rather than having a large load transporter complete delivery. That is, carriers and small load transporters may be particularly well-suited for short-range delivery. However, carriers may be limited to geo-fenced and/or slow-traffic areas, and cargo bikes may be limited by factors such as speed, battery life, and human exhaustion. Thus, large load transporters such as delivery trucks may be better-suited for longer-range delivery. The load 810 may include a plurality of parcels, such as a first parcel 812, a second parcel 814, a third parcel 816, and a fourth parcel 818. As shown in FIG. 8, the parcels 812 and 814 may be placed upon a first platform 820, and the parcels 816 and 818 may be placed upon a second platform 822. However, other embodiments may be configured in any suitable manner to enable any suitable number of parcels to fit inside of the load transporter 800.

The parcels 810 may be destined for the same or different location(s) within the destination zone. In some embodiments, the destination zone for the load 810 may be less than one (1) mile from the transit link, in which case it may be practical for the load transporter 800 to deliver the load 810 to the destination zone, thereby freeing the carrier to continue along the transit line and pick up additional parcels for delivery. Additionally, it may be desirable for the load transporter 800 to circumvent delivery restrictions and/or traffic congestion in an urban environment, such as by utilizing bike lanes, multi-use paths, and/or bike paths to move through traffic more quickly. For example, the load transporter 800 may serve the same one-mile radius between a transit link and a destination zone by picking up the parcel load 810 from a carrier at the transit link, delivering the load 810 to the destination zone, and returning to the transit link to pick up another load for delivery. (Likewise, the load transporter may serve an area between a storage hub and a destination zone.) Using the load transporter 800 to complete last-mile delivery—as opposed to using carriers and/or delivery trucks—may therefore reduce traffic congestion, reduce $CO_2$ gas emissions, reduce noise, reduce "wear and tear" on roadways, create "green collar" jobs, and offer partnership opportunities between transit agencies, private businesses, and even independent couriers seeking to earn extra income by making deliveries in their very own neighborhoods.

Although the load transporter 800 is shown as a cargo bike, any suitable load transporter may be used, including but not limited to a pedicab, a trike, a bicycle with a flatbed, a regular bicycle, and/or even an automobile such as a private car or truck. These load transporters may be configured to transport parcels or other materials during any portion of the delivery path, not limited to only the last mile and/or areas near the destination zone 20. In the case of a private car, a rideshare driver may serve as an independent contractor for one or more rideshare companies, and also ferry parcels between transit links and destination zones (and/or origin zones) as a way to earn extra income and minimize downtime between jobs. Similarly, a bicycle courier may ferry parcels between transit links and destination zones (and/or origin zones) to earn extra income and minimize downtime between dispatches. Larger vehicles, such as delivery vans and/or trucks may also be suitable for facilitating first- and or last-mile delivery, particularly in situations involving extreme weather conditions and/or longer distances between transit links and destination zones.

Figure 9:
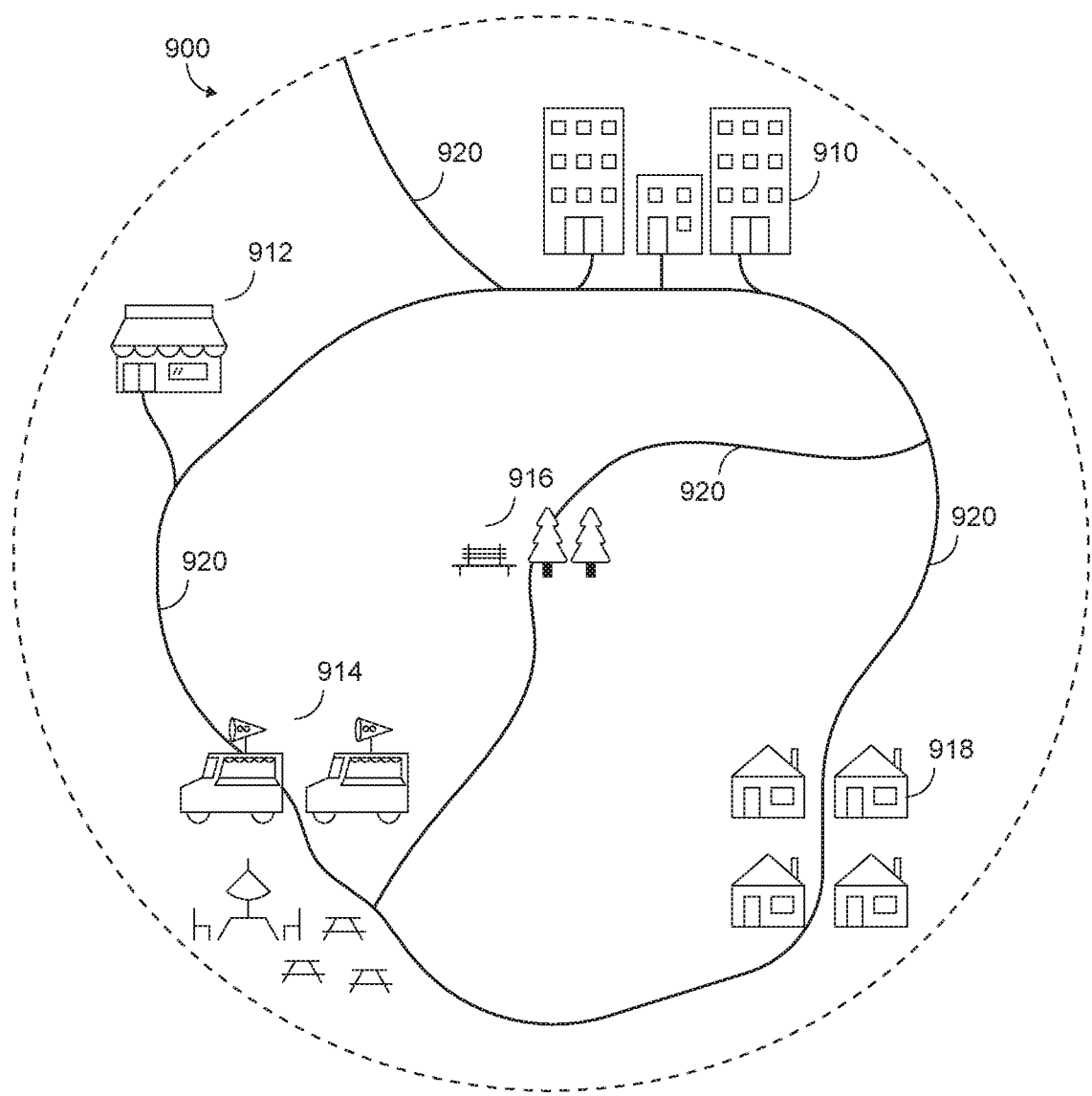
FIG. 9 shows a more detailed view of a destination zone of FIG. 1, according to aspects of the present teachings.

FIG. 9 shows a more detailed view of a destination zone 900 (corresponding to the destination zone 20 of FIG. 1), according to aspects of the present teachings. The destination zone 900 may include multiple final destinations, such as but not limited to an office center 910, a convenience store 912, a food truck area 914, a park 916, and/or a residential area 918. In some embodiments, these final destinations may be connected by a multi-use and/or bike path 920. Additionally or alternatively, the final destinations may be connected by one or more roadway(s), sidewalk(s), and/or any other suitable path(s) on which a load transporter or carrier may travel. For example, a load transporter or carrier may enter the destination zone 900 via the bike path 920, deliver the parcel 812 to the office center 910, and then continue along the bike path 920 to deliver the parcel 814 to the residential area 918, the parcel 816 to the food truck area 914, and the parcel 818 to the convenience store 912. In some embodiments, the destination zone 900 may also serve as an "origin" zone. For example, a lawyer who works at the office center 910 may send legal documents away from the "destination" zone 900 and toward another location along the delivery path. Alternatively or additionally, an artist who works from home at the residential area 918 may ship fine art prints to her fans away from the "destination" zone 900, toward a post office along or near the delivery path, from where the prints may be shipped worldwide.

Alternatively, a load transporter or a carrier may convey the load 810 to the park 916, such as where the load 810 may include picnic supplies that were ordered by picnickers in the park. If conveyed by a carrier having a locker system, the carrier may effectively turn the park 916 into a mini commerce center, and may include a farmer's market, a mail center, an event space, a pop-up shop, or any combination thereof. In other embodiments, a load transporter or a carrier may deliver the load 810 to the convenience store 912. Particularly where the destination zone 900 may be a "food desert," it may be useful for the load 810 to include fresh, affordable, and nutritious foods that the convenience store 912 may otherwise not have in stock. Accordingly, the load transporter or carrier may serve as a portable vending machine, a portable grocery store, or simply a means of delivering parcels to customers at their homes or offices. Additionally, as described in further detail above, a carrier may also serve as a portable warehouse, such as where a plurality of carriers may form a storage hub to secure goods while not in active transport.

ADVANTAGES, FEATURES, BENEFITS

The different embodiments of the systems and methods for the intermodal delivery of materials via at least substantially autonomous carriers and transit vehicles described herein may provide several advantages over previous autonomous delivery systems and methods. For example, the illustrative embodiments described herein allow for carriers capable of docking directly with transit vehicles to make deliveries while traveling along existing transit lines, thereby reducing the amount of "wear and tear" caused by friction between carriers and roads. Thus, using low-friction rail transit, along with using prepaid transit movement, may enable materials delivery at only a fraction of the costs that may be associated with traditional shipping methods.

Additionally, and among other benefits, illustrative embodiments described herein allow for carriers to stop and recharge at storage hubs located at any underutilized parking facility substantially along the delivery path. Using the environmental sensors built into the carriers to detect potential theft and/or vandalism, as well as a network connected to a centralized server to control the movement and configuration of the carriers, the storage hubs may act as securable and portable warehouses. These storage hubs offer significant advantages over traditional warehouses because they can bypass the costs of constructing walled-in and/or covered enclosures, as well as labor costs associated with security and handling. No known systems or methods can produce these results, particularly in the delivery industry where storage and last-mile delivery present the common challenges of costliness, inefficiency, poor inventory management, damage to materials, and remoteness from final destinations.

Thus, the illustrative embodiments described herein are particularly useful for optimizing the underutilized capacity of transit and parking infrastructures to thereby foster mutually-beneficial partnerships between transit agencies, private companies, and/or individuals who own private vehicles (such but not limited to cars, bikes, and trucks), while enjoying the economic benefits of smoother supply chains, as well as the environmental benefits associated with using transit and electric vehicles. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A smart delivery system, comprising:
   at least one at least partially autonomous carrier configured to:
     ride within, autonomously move around within, and removably dock within a mass transit vehicle, to thereby enable said carrier to travel along a mass transit line to deliver at least one material along a delivery path, from an origin zone to a destination zone, and
     navigate along the delivery path based on environmental data obtained via a plurality of sensors;
   a server configured to:
     communicate delivery data with a carrier transceiver of the carrier, the delivery data including at least one of a material quantity and a means of material identification,
     communicate mass transit data with the carrier transceiver, the mass transit data comprising at least one of a mass transit vehicle location and a mass transit link location; and
   a computing device with a memory and processor configured to:
     communicatively connect with the server,
     process the delivery data and mass transit data to compute the delivery path, based at least in part on the delivery data and the mass transit data, and re-compute the delivery path in real time based on at least the environmental data.

2. The system of claim 1, further comprising at least one mass transit link to serve as a secure area, said at least one at least partially autonomous carrier being configured to removably dock within a mass transit vehicle stopped at said at least one mass transit link to ride the mass transit vehicle during at least one mass transit leg of the delivery path.

3. The system of claim 2, wherein said at least one at least partially autonomous carrier is configured to ride a plurality of mass transit vehicles during a plurality of mass transit, legs of the delivery path.

4. The system of claim 1, further comprising a storage hub, and wherein said at least one at least partially autonomous carrier comprises a plurality of at least partially autonomous carriers, each carrier configured to deliver at least one material along a delivery path, from an origin zone to a destination zone, each carrier being adapted to be charged at said storage hub and controllable by said server, said server being able to remotely control and arrange said plurality of at least partially autonomous carriers at said storage hub to increase security of said plurality of at least partially autonomous carriers and materials to be delivered.

5. The system of claim 1, further comprising a mass transit vehicle having a carrier area designated marked with a line within said mass transit vehicle so that the passengers sharing said mass transit vehicle may know to vacate the designated carrier area when said at least one at least partially autonomous carrier boards said mass transit vehicle.

6. The system of claim 1, wherein said at least one at least partially autonomous carrier is adapted to one of:
wirelessly communicates with the mass transit vehicle to one of automatically fold up a foldable seat and move a stanchion of the mass transit vehicle when the carrier is in close proximity, and
one of push up a foldable seat and move a stanchion of the mass transit vehicle when the carrier positions itself in place within the mass transit vehicle.

7. An at least partially autonomous parcel carrier, comprising:
a carrier body configured to:
receive at least one parcel to be delivered from an origin zone to a destination zone and along a pre-determined delivery path, and
ride within, autonomously move around within, and removably dock within a mass transit vehicle to thereby enable the carrier to travel along a mass transit line for at least one mass transit leg of the delivery path;
a carrier transceiver configured to:
communicatively connect with at least a server,
receive delivery data from the server, wherein the delivery data includes at least one of a parcel quantity and a means of parcel identification,
receive mass transit data from the server, wherein the mass transit data includes at least one of a mass transit vehicle location, a mass transit link location, and a mass transit schedule,
transmit carrier data to the server as the carrier travels along the delivery path, wherein the carrier data includes at least a carrier location,
receive directions from the server to board and ride at least one suitable mass transit vehicle for the delivery path selected based at least in part on an economic value, an environmental value, and a public welfare value,
communicatively connect and interact with the at least one mass transit vehicle to autonomously navigate within the mass transit vehicle; and
a navigation control operatively connected to said, carrier transceiver, and including a memory and a processor configured to:
receive environmental data via a plurality of sensors,
compute the delivery path based on at least one of the delivery data, the mass transit data, and the environmental data,
re-compute the delivery path in real time based on the environmental data, and
determine at least one safety parameter based on the environmental data, wherein the at least one safety parameter includes at least a carrier travel speed.

8. The carrier of claim 7, wherein said carrier body includes at least one compartment configured to enable removal of the at least one parcel upon providing suitable parcel access data to the carrier.

9. The carrier of claim 7, wherein the plurality of sensors includes at least one of a LIDAR sensor, a RADAR sensor, and a camera sensor capable of detecting potential impacts, theft, and vandalism.

10. The carrier of claim 7, further comprising a plurality of lights configured to indicate at least one of a direction of travel, a change in the direction of travel, and a deceleration of the carrier.

11. The carrier of claim 7, wherein at least one wheel of the carrier is configured to removably engage with a railway, thereby enabling the carrier to travel along the railway during at least one mass transit leg of the delivery path.

12. The carrier of claim 7, wherein said carrier body has a width, a height, and a length suitable to clear an opening of the mass transit vehicle so that the carrier is securably positionable inside the mass transit vehicle.

13. The at least partially autonomous parcel carrier of claim 7, wherein the carrier is adapted to one of:
wirelessly communicate with the mass transit vehicle to one of automatically fold up a foldable seat and move a stanchion of the mass transit vehicle when said carrier body is in close proximity, and
one of push up a foldable seat and move a stanchion of the mass transit vehicle when said carrier body positions itself in place within the mass transit vehicle.

14. The parcel carrier of claim 7, further comprising at least one mass transit link to serve as a secure area, the parcel carrier being configured to removably dock within a mass transit vehicle stopped at said at least one mass transit link to ride the mass transit vehicle during at least one mass transit leg of the delivery path.

15. The parcel carrier of claim 14, wherein the parcel carrier is adapted to ride a plurality of mass transit vehicles during a plurality of mass transit legs of the delivery path.

16. A system for intermodal materials delivery, comprising:
at least one at least partially autonomous carrier configured to:
deliver at least one material along a delivery path, from an origin zone of the material to a destination zone of the material,
utilize a mass transit vehicle to facilitate movement of the carrier during at least one mass transit leg of the delivery path,
make space on the mass transit vehicle for a passenger having one of a wheelchair and a stroller,
interact with the mass transit vehicle to autonomously navigate within the mass transit vehicle, navigate along the delivery path based on environmental data obtained via a plurality of sensors, and at least one mass transit vehicle configured to:
receive and transport a plurality of passengers inside said at least one mass transit vehicle,
receive said at least one carrier within said at least one mass transit vehicle,
said mass transit vehicle having a designated area therein for said at least one carrier so that any passengers sharing the mass transit vehicle with said at least one carrier may know to vacate the area when said at least one carrier boards said at least one mass transit vehicle; and a server configured to:
communicate delivery data with a carrier transceiver of said at least one carrier, the delivery data including at least, one of a material quantity and a means of material identification,
communicate mass transit data with the carrier transceiver, the mass transit data including at least one of a mass transit vehicle location and a mass transit link location,
communicate with the carrier transceiver to direct said at least one carrier to board and ride said at least one mass transit vehicle; and a computing device with a memory and processor configured to:
communicatively connect with said server,
process the delivery data and the mass transit data to select the at least one mass transit vehicle suitable for delivering the at least one material based at least in part on a transit ridership level, an economic value, an environmental value, and a public welfare value,
process the delivery data and the mass transit data to compute the delivery path, based at least in part on the delivery data and the mass transit data, and
re-compute the delivery path in real time based on at least the environmental data.

17. The system of claim 16, wherein the delivery data further comprises at, least one of a material size, a material weight, a pickup point, and a pickup time.

18. The system of claim 16, wherein the mass transit data further comprises at least one of a transit schedule, a transit vehicle location, a transit link location, and a transit route.

19. The system of claim 16, wherein said at least one carrier is configured to dock with said at least one mass transit vehicle when said at least one mass transit vehicle is stopped at a mass transit link.

20. The system of claim 16, wherein said at least one at least partially autonomous carrier comprises a plurality of sensors so that said carrier may stop and change course to avoid potential impacts while moving in or out of the designated area in said at least one mass transit vehicle to make space for passengers.

21. The system of claim 16, wherein said at least one at least partially autonomous carrier is adapted to one of:
wirelessly communicate with the mass transit vehicle to automatically one of fold up a foldable seat and move a stanchion of the mass transit vehicle when said carrier is in close proximity; and
one of push up a foldable seat and move a stanchion of the mass transit vehicle when said carrier positions itself in place within the mass transit vehicle.

22. The system of claim 16, further comprising at least one mass transit link to serve as a secure area, said at least one at least partially autonomous carrier being configured to removably clock within said at least one mass transit vehicle stopped at said at least one mass transit link to ride said at least one mass transit vehicle during at least one mass transit leg of the delivery path.

23. The system of claim 22, wherein said at least one at least partially autonomous carrier is adapted to ride a plurality of mass transit vehicles during a plurality of mass transit legs of the delivery path.

* * * * *